US012705031B2

(12) United States Patent
Felbah et al.

(10) Patent No.: US 12,705,031 B2
(45) Date of Patent: Aug. 11, 2026

(54) SYSTEM AND METHOD OF KEYWORD SENSITIVE SEMANTIC SEARCH SCORING FOR HIERARCHICALLY RELATED ARTIFICIAL INTELLIGENCE PRODUCTIVITY TOOL-ENABLABLE APPLICATION CAPABILITIES FOR A USER QUERY INPUT AT AN INFORMATION HANDLING SYSTEM

(71) Applicant: Dell Products LP, Round Rock, TX (US)

(72) Inventors: Daniel Felbah, Toledo, OH (US); Ashutosh Singh, Austin, TX (US); Mona Sachdev, Round Rock, TX (US)

(73) Assignee: DELL PRODUCTS LP, Round Rock, TX (US)

(*) Notice: Subject to any disclaimer, the term of this patent is extended or adjusted under 35 U.S.C. 154(b) by 124 days.

(21) Appl. No.: 18/784,763

(22) Filed: Jul. 25, 2024

(65) Prior Publication Data

US 2026/0029998 A1 Jan. 29, 2026

(51) Int. Cl.

*G06F 17/27* (2006.01)
*G06F 8/36* (2018.01)
*G06F 16/3332* (2025.01)
*G06F 40/289* (2020.01)
*G06F 40/30* (2020.01)

(52) U.S. Cl.

CPC ............ *G06F 8/36* (2013.01); *G06F 16/3334* (2019.01); *G06F 40/289* (2020.01); *G06F 40/30* (2020.01)

(58) Field of Classification Search

CPC ...... G06F 8/36; G06F 16/3334; G06F 40/289; G06F 40/30; G06F 16/9024; G06N 5/02

USPC .............................................................. 704/9

See application file for complete search history.

(56) References Cited

U.S. PATENT DOCUMENTS 8,548,951 B2 10/2013 Solmer
9,201,957 B2 12/2015 Turdakov
9,626,358 B2 4/2017 Danielyan
9,648,683 B2 5/2017 Dang
10,146,593 B2 12/2018 Gong
(Continued)

FOREIGN PATENT DOCUMENTS

WO 2020/192587 A1 10/2020

*Primary Examiner* — Md S Elahee

(74) *Attorney, Agent, or Firm* — Prol Intellectual Property Law, PLLC; H. Kenneth Prol

(57) ABSTRACT

An information handling system for an on-the-box artificial intelligence productivity tool may comprise a memory storing descriptions of capabilities associated with software applications in a decision tree with each capability and a generated capability intent value stored as a capability node grouped under one of several branches in parent-child relationships, and a hardware processor executing machine readable code instructions to generate a query input intent value from a user query input requesting action by one of the software applications, comparing the capability intent values of the capability nodes along a branch in the decision tree with a weighted by a TF-IDF comparison between the user query input and each of the descriptions of capabilities to identify a best match capability node having a highest TF-IDF weighted cosine semantic similarity search score, and executing an associated best match capability for a first software application having the best match capability node.

20 Claims, 8 Drawing Sheets

(56) References Cited

U.S. PATENT DOCUMENTS 11,620,262 B2 4/2023 Lee
11,948,073 B2 4/2024 Zhang
2018/0365065 A1 12/2018 Guttman
2020/0387550 A1 12/2020 Cappetta
2020/0394360 A1 12/2020 Dunn
2021/0256207 A1 8/2021 Dunn
2021/0334194 A1 10/2021 Xiao
2021/0366506 A1 11/2021 Han
2021/0374353 A1 12/2021 Zhang
2022/0035684 A1 2/2022 Gupte
2022/0035732 A1 2/2022 Xiao
2022/0092439 A1 3/2022 Liu
2022/0318502 A1 10/2022 Howell
2023/0105806 A1 4/2023 Dunn
2023/0132061 A1* 4/2023 Pfitzmann ............... G06F 40/30
706/45
2023/0222359 A1 7/2023 Panikkar
2023/0237263 A1 7/2023 Howell
2023/0251962 A1 8/2023 Xiao
2023/0409614 A1* 12/2023 Hamilton ............ G06F 16/9024
2024/0054318 A1 2/2024 Feltin
2024/0061719 A1 2/2024 Reddy
2024/0069770 A1 2/2024 Prabhakar
2024/0069959 A1 2/2024 Prabhakar
2024/0070113 A1 2/2024 Prabhakar
2024/0144032 A1* 5/2024 Liang ....................... G06N 5/02
2024/0161003 A1 5/2024 Alexander
2024/0386015 A1* 11/2024 Crabtree ............. G06F 16/9024

* cited by examiner

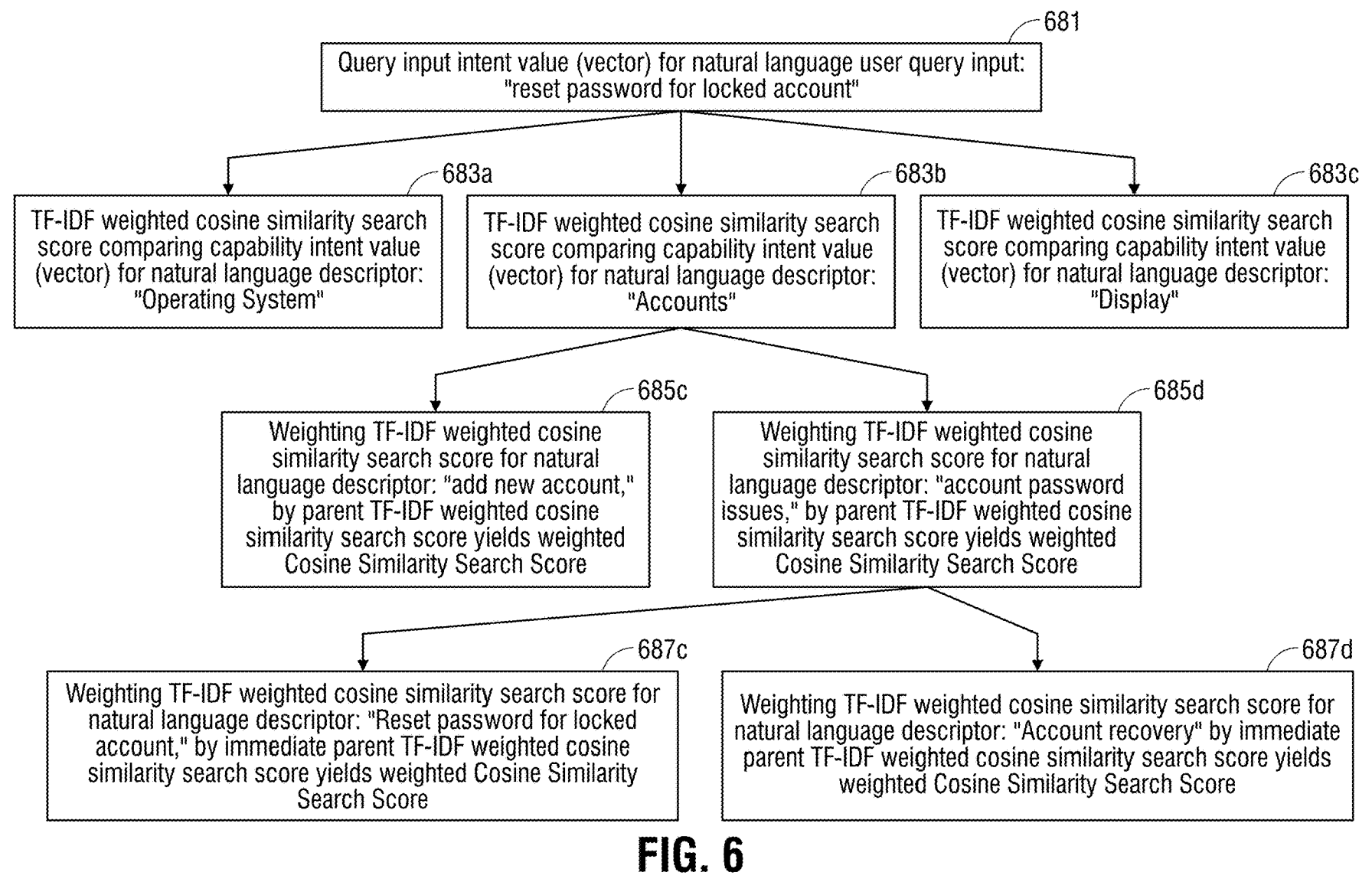

681
Query input intent value (vector) for natural language user query input: "reset password for locked account"

683a
TF-IDF weighted cosine similarity search score comparing capability intent value (vector) for natural language descriptor: "Operating System"

683b
TF-IDF weighted cosine similarity search score comparing capability intent value (vector) for natural language descriptor: "Accounts"

683c
TF-IDF weighted cosine similarity search score comparing capability intent value (vector) for natural language descriptor: "Display"

685c
Weighting TF-IDF weighted cosine similarity search score for natural language descriptor: "add new account," by parent TF-IDF weighted cosine similarity search score yields weighted Cosine Similarity Search Score 685d
Weighting TF-IDF weighted cosine similarity search score for natural language descriptor: "account password issues," by parent TF-IDF weighted cosine similarity search score yields weighted Cosine Similarity Search Score 687c
Weighting TF-IDF weighted cosine similarity search score for natural language descriptor: "Reset password for locked account," by immediate parent TF-IDF weighted cosine similarity search score yields weighted Cosine Similarity Search Score 687d
Weighting TF-IDF weighted cosine similarity search score for natural language descriptor: "Account recovery" by immediate parent TF-IDF weighted cosine similarity search score yields weighted Cosine Similarity Search Score

FIG. 6

SYSTEM AND METHOD OF KEYWORD SENSITIVE SEMANTIC SEARCH SCORING FOR HIERARCHICALLY RELATED ARTIFICIAL INTELLIGENCE PRODUCTIVITY TOOL-ENABLABLE APPLICATION CAPABILITIES FOR A USER QUERY INPUT AT AN INFORMATION HANDLING SYSTEM

FIELD OF THE DISCLOSURE

The present disclosure generally relates to execution of computer readable code instructions of artificial intelligence (AI) productivity tools with an information handling system. The present disclosure more specifically relates systems and methods of identifying an artificial intelligence productivity tool-enableable software application capability that is a best match for an action requested by a user within a received user query input using a keyword sensitive semantic similarity search score for a text frequency-inverse document frequency (TF-IDF) weighted semantic similarity of search across a plurality of such capabilities having hierarchical parent-child relationships to one another.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more software applications such as workspace productivity applications, or gaming applications or the like. Further, the information handling system may include AI productivity tools that interface with various AI productivity tool-enablable software applications such as natural language chat-enabled environments for interface with services of software applications that increase the efficiency of the operation of the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 6 is a block diagram illustrating a method of executing computer readable code instructions to identify a capability that best matches a received user query input and is a child for each of a plurality of capabilities identified in metadata as falling within a chain of parents, such that capability intent values that generate a highest TF-IDF weighted cosine similarity search score at a branch linking the chain of parents within the capabilities decision tree.

The use of the same reference symbols in different drawings may indicate similar or identical items.

DETAILED DESCRIPTION OF THE DRAWINGS

Figure 1:
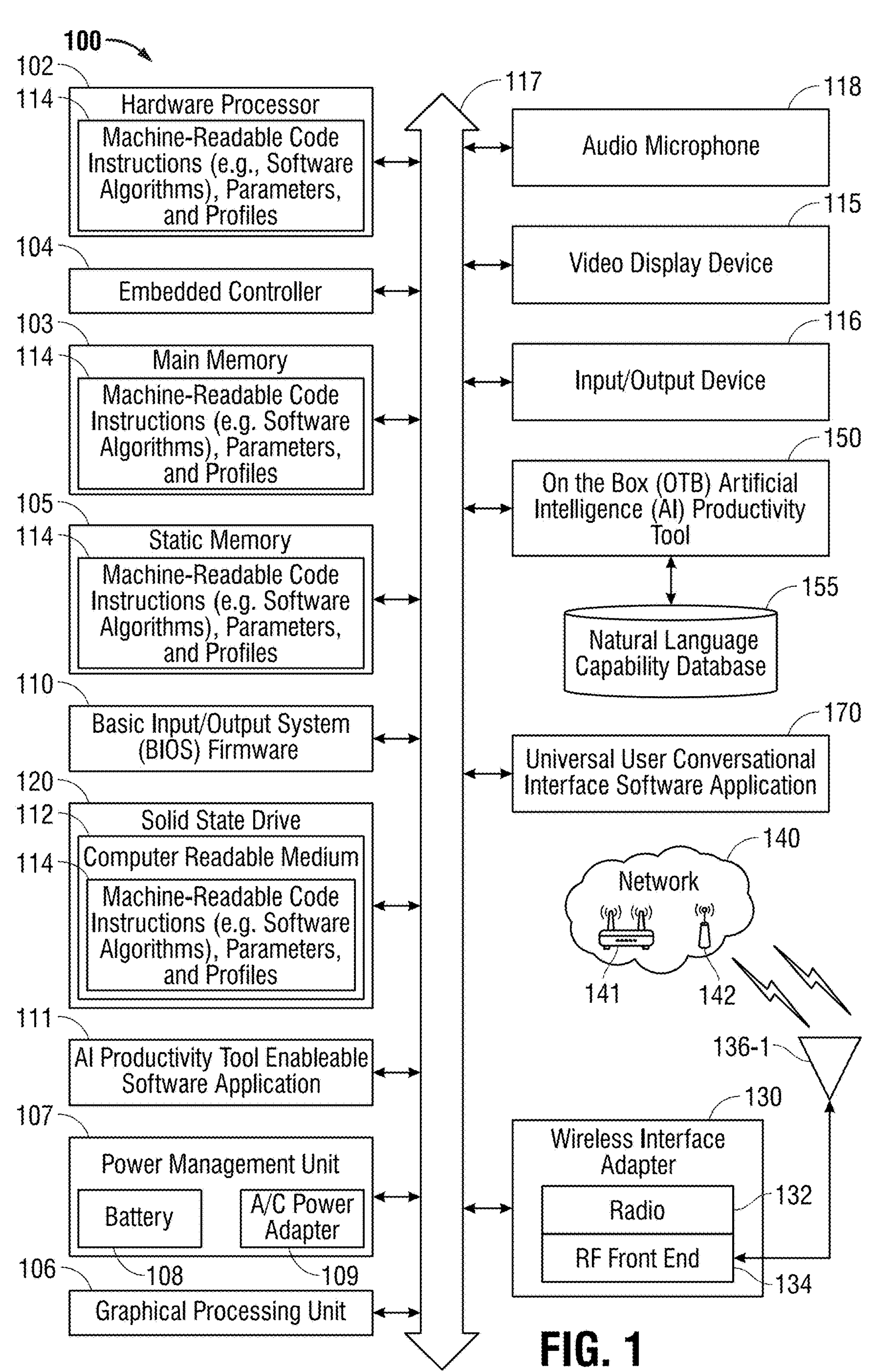
FIG. 1 is a block diagram illustrating an information handling system that includes an on the box (OTB) artificial intelligence (AI) productivity tool to select among a plurality of AI productivity tool-enablable software application capabilities for services, operations, or responses to a user query input according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Artificial intelligence (AI) is a developing technology that is used to increase efficiency of computing systems and interactions with humans. An example of AI technologies includes, but is not limited to, chat-enabled environments (voice, text, etc.). These chat-enabled environments are described in embodiments herein as an on the box (OTB) AI productivity tool that receives this voice or text input from a user and implements a number of actions or utilizes services of various software applications based on the natural language of the input. In some information handling systems, the OTB AI productivity tool may interface with various AI productivity tool-enablable software applications being executed or executable on the information handling system. These AI productivity tool-enablable software applications may integrate with the OTB AI productivity tool to allow user queries to trigger certain actions declared, supported, and managed by these AI productivity tool-enablable software applications.

A hardware processor executing code instructions of the OTB AI productivity tool in embodiments herein may match these received user queries from user query inputs to known capabilities of one or more of the AI productivity tool-enableable software applications through execution by a hardware processor of machine readable code instructions for one or more natural language processing machine learning model algorithms. This process includes gathering, either in real-time or prior to execution of the OTB AI productivity tool, capabilities associated with each of a plurality of AI productivity tool-enablable software applications. These capabilities (also called capability intents and having capability intent values representing a semantic meaning value for descriptions of the capabilities) may describe those functionalities of each of the AI productivity tool-enablable software applications that may be used when interfacing with the OTB AI productivity tool. These natural language descriptions of the capabilities for the AI productivity tool-enableable software applications may be stored within a natural language capability database for comparison to received user query inputs, for example, in order to identify a capability most likely to address a user's request within the received user query inputs.

The natural language descriptions of capabilities for the AI productivity tool enableable software applications in an embodiment may be organized into a hierarchical capabilities decision tree that maps logical parent-child relationships between and among the plurality of natural language descriptions of the capabilities in embodiments of the present disclosure. Each node of this hierarchical capabilities decision tree in embodiments herein may have the same data fields, including a capability name, capability identification (ID) (e.g., in alphanumeric values), and a natural language description of the capability. In some embodiments, each node may further include a capability intent value, or one or more keywords within the capability natural language description. The hierarchical capabilities decision tree in embodiments herein may identify child capability natural language descriptions or phrases therewithin as providing greater specificity than its identified parent capability natural language description or phrases. For example, a parent capability natural language description phrase such as "passwords" may have two child capability natural language description phrases, including "Microsoft password," and "Outlook password," each providing a more specific example of the parent phrase "password."

Parent capability natural language descriptions or phrases may be separated from children capability natural language descriptions or phrases within the hierarchical capabilities decision tree in embodiments herein by branches. Each level of the hierarchical capabilities decision tree may thus include one or more nodes identified as a child, and connected via a branch to one of the nodes in the previous level of the hierarchical capabilities decision tree. Each capability natural language description or phrase identified as a child in such a way within the hierarchical capabilities decision tree may include an identification of its parent node or parent capability natural language description/phrase.

A hardware processor executing machine readable code instructions for a capability intent value generator of the OTB AI productivity tool may determine capability intent values associated with semantic meaning of these natural language descriptions of the gathered capabilities for each of a plurality of AI productivity tool-enablable software applications. These capability intent values are a mathematical representation of capability operations or services from various AI productivity tool-enablable software applications in embodiments herein. These capability intent values may be represented by a mathematical value in a multi-axis vector space that may be associated with a natural language description for that capability or intent. In an embodiment, the capabilities may be associated with an identification (ID) such as an alphanumeric ID that also may be stored within a natural language capability database. Generating such capability intent values as vectors may be a first step in a natural language processing method to determine and correlate the user's query intent or requested action within a user query input that takes into account the context or semantics of the words used within the user query input with one of a plurality of capabilities.

Upon receipt of a user query input by the OTB AI productivity tool in embodiments herein, a hardware processor executing code instructions of a query intent determination module may determine a vectorized query input intent value for the user query input that may be comparable to the capability intent values. The hardware processor executing machine readable code instructions for a query intent to capability determination module in embodiments herein may then perform one or more similarity search methods to match the query input intent value with a capability intent value in order to identify a capability for an AI productivity tool-enableable software application that most closely corresponds and can address the user request within the user query input. One methodology for matching text or documents may center upon keyword or lexical searches, such as term frequency-inverse document frequency (TF-IDF) searches. TF-IDF searches in this context focus upon the frequency of a term or keyword found within a user query input and within known capabilities for the AI productivity tool enableable software applications. TF-IDF methodologies lack the ability to determine context of the various keywords identified within the user query input, however. For example, TF-IDF methodologies cannot discern between different meanings for the same word or identify synonyms for keywords, which people routinely employ in natural language conversation. This may result in limits for matching between natural language text excerpts, such as the user query input and the software service or function described in a natural language description of the capability for an AI productivity tool-enableable software application.

In embodiments herein, a hardware processor may execute machine readable code instructions for a semantic similarity search machine learning model that analyzes and weighs context and relevancy to overcome this disadvantage of TF-IDF methodologies. For example, in embodiments herein, a hardware processor may execute machine readable code instructions for a semantic similarity search machine learning model, via a query intent to capability module, which compares the vectorized user query input intent value and the capability intent values stored within the natural language capability database. Such a comparison may be performed using a semantic search machine learning model, such as a cosine similarity search that compares the distance or value difference in a multi-axis vector space between two vectors (e.g., the capability intent value vector and the user query input value vector) to determine the contextual similarity between the natural language description of the capability and the natural language user query input. Such a contextual or semantic search methodology may take into account the fact that the same word may have two meanings or consider synonyms of words, for example. This may be performed for several of the capability intent values stored within the natural language capability database to identify a capability intent value that most closely matches the user query input value. In such a way, a hardware processor executing code instructions for the query intent to capability module for the OTB AI productivity tool may take relevance and context of natural language within a user query input into account when determining a matching capability of an AI productivity tool enableable software application that is most likely to address the user's intent within the user query input.

While semantic search methodologies are better-suited for use with natural language text excerpts than TF-IDF methodologies that do not consider context, TF-IDF methodologies are better-suited than semantic search methodologies where a single keyword within the user query input is important to identifying a matching capability for an AI productivity tool-enableable software application to address the user's concerns. For example, a user may provide a natural language user query input such as "resolve error code 0xc0000142." In such a scenario the semantic search methodologies may identify that an error code needs to be resolved, but it may not focus heavily on the term "0xc0000142," which may be critical to finding the right AI productivity tool enableable software application to resolve the error code. In such a case, it may be useful to also perform a TF-IDF comparison across the stored natural language descriptions of the capabilities within the natural language capabilities database to identify the capability that best addresses the specific term "0xc0000142," according to embodiments herein.

As described in embodiments herein, a hardware processor executing machine readable code instructions for the query intent to capability determination module of the OTB AI productivity tool may compare the vectorized user query input intent value and each of several capability intent values using a semantic search approach, such as a cosine similarity search or comparison. Thus, the hardware processor executing machine readable code instructions for the query intent to capability determination module may compare a single user query input to a plurality of natural language capabilities for AI productivity tool enableable software applications. This process may be performed for each of the capability intent values determined for each of the capability natural language descriptions. However, such a thorough comparison against all capability natural language descriptions may be superfluous and result in data saturation where more processing resources are consumed than are necessary to reach an accurate conclusion.

In order to overcome the risk of such data saturation in embodiments of the present disclosure, the hardware processor executing machine readable code instructions for the query intent to capability determination module of the OTB AI productivity tool may limit the number of comparisons made against the query input intent value based on relationships of capabilities identified within metadata and illustrated by the positions of the natural language descriptions of the capabilities, or phrases therewithin, as given in the hierarchical capabilities decision tree in embodiments of the present disclosure. Further, in order to increase the accuracy of these semantic comparison results, the hardware processor executing machine readable code instructions for the query intent to capability determination module of the OTB AI productivity tool in embodiments herein may, for each compared user query input and natural language capability, perform a TF-IDF comparison.

For example, the hardware processor executing machine readable code instructions for the query intent to capability determination module of the OTB AI productivity tool may determine, for each natural language capability at a first level of the hierarchical capabilities decision tree, a cosine semantic similarity search score that compares the vectorized user query input intent value and the capability intent values for the natural language descriptions of the capabilities at the first level. These cosine semantic similarity search scores may then be weighted by TF-IDF comparison scores that compare the user query input natural language against the natural language description of the capabilities at the first level for keyword association and correlation. The hardware processor executing machine readable code instructions of the query intent to capability determination module may then determine a parent best match capability having a highest TF-IDF weighted cosine semantic similarity search score among the natural language capabilities at the first level of the hierarchical capabilities decision tree.

Instead of performing this determination for each node of the second level of the hierarchical capabilities decision tree, the hardware processor executing machine readable code instructions for the query intent to capability determination module may determine a TF-IDF weighted cosine semantic similarity search score only for the children of the capability natural language description identified as the parent best match capability for the previous level of the hierarchical capabilities decision tree. Comparison of TF-IDF weighted cosine semantic similarity search scores, as performed via execution of machine readable code instructions of the query intent to capability determination module by the hardware processor in embodiments herein, may be limited at each level of the hierarchical capabilities decision tree to children of the natural language description of the capability at the previous level having a capability intent value generating a highest TF-IDF weighted cosine semantic similarity search score. In some embodiments, the TF-IDF weighted cosine semantic similarity search score for each child node may be further weighted by the TF-IDF weighted cosine semantic similarity search score for its parent. In such a way, the hardware processor executing machine readable code instructions of the query intent to capability determination module may consistently narrow focus of comparisons between the query input intent value and the plurality of capability intent values to natural language descriptions of increasing specificity.

The natural language capability for an AI productivity tool enableable software application having the highest TF-IDF weighted cosine semantic similarity search score or parent-score and TF-IDF weighted cosine semantic similarity search score within a particular branch searched of the hierarchical capabilities decision tree in various embodiments may then be identified, via execution of machine readable code instructions of the query intent to capability determination module by the hardware processor, as the capability having the highest statistical correlation and most likely to address the user's intended request within the natural language user query input. In such a way, the hardware processor executing code instructions for the query intent to capability module for the OTB AI productivity tool may overcome or lessen the impacts of data saturation encountered by comparing the query input intent value to all capability intent values, thus decreasing consumption of processing resources, and may enhance semantic search performance by also considering critical keywords when determining a matching capability of an AI productivity tool enableable software application that are most likely to address the user's intent within the user query input.

Turning now to the figures, FIG. 1 illustrates an information handling system 100 executing machine-readable code instructions of an on the box (OTB) artificial intelligence (AI) productivity tool similar to the information handling systems according to several aspects of the present disclosure. As described herein, hardware processor 102 executing machine-readable code instructions of the OTB AI productivity tool 150 in an embodiment may perform one or more similarity search methods to match a received query and query input intent value with a capability intent value and capability in order to identify a capability for an AI productivity tool-enableable software application 111 that can address the user request within the user query input. A text frequency-inverse document frequency (TF-IDF) keyword comparison may also be performed to enhance a semantic search performance using the query intent value and capability intent values above by also identifying and considering critical keywords when determining a matching capability of an AI productivity tool enableable software application that is most likely to address the user's intent within the user query input. The OTB AI productivity tool 150 in an embodiment may receive, via a universal user conversational interface software application 170 or other audio or text interface, a voice or text input from a user, described herein as a user query input in natural language that requests actions or services of various software applications. The hardware processor 102 may execute machine readable code instructions for a semantic similarity search machine learning model that analyzes and weighs context and relevancy of the natural language within the user query input to identify a registered capability, also provided with a natural language description of that capability, for an AI productivity tool enableable software application 111 that may perform the action or service requested within the user query input.

Use of such a semantic similarity search with a hierarchical capabilities decision tree according to embodiments herein may overcome or lessen the impacts of data saturation encountered by comparing the query input intent value to all capability intent values, and may thus decrease consumption of processing resources. Use of the hierarchical capabilities decision tree according to embodiments herein for a semantic search or combined semantic and lexical TF-IDF search may narrowing focus of comparisons between a query input intent value for an incoming user query input and a plurality of capability intent values for a plurality of registered natural language descriptions of capabilities of AI productivity tool enableable software applications 111 executing on an information handling system 100. The hierarchical capabilities decision tree according to embodiments herein provides increasing specificity, as defined within branches of the hierarchical capabilities decision tree in embodiments herein. This assists in making more efficient the hardware processor 102 executing computer readable code instructions of the OTB AI productivity tool 150 and associated modules when the number of capabilities of AI productivity tool enableable software applications 111 that may be responsive to user query inputs at an OTB AI productivity tool 150 becomes a larger number relative to using comparison to all available capabilities.

In an embodiment, the hardware processor 102 executing machine readable code instructions for the OTB AI productivity tool 150 may similarity match or correlate received user queries, or user query inputs to known capabilities of one or more of the AI productivity tool-enableable software applications, such as 111 by comparing natural language descriptions of the known capabilities to the natural language text of the user query input. This process in an embodiment may include gathering, either in real-time or prior to execution of the OTB AI productivity tool 150, capabilities associated with each of a plurality of AI productivity tool-enablable software applications, such as 111, and describing in natural language functionalities of each of the AI productivity tool-enablable software applications that may be used when interfacing with the OTB AI productivity tool 150.

The natural language descriptions of capabilities for the AI productivity tool enableable software applications 111 stored in the natural language capabilities database 155 in an embodiment may be organized into a hierarchical capabilities decision tree, also stored at the natural language capabilities database 155 that maps logical parent-child relationships between and among the plurality of natural language descriptions as described in embodiment herein. Each node of this hierarchical capabilities decision tree may include a capability name, capability identification (ID) (e.g., in alphanumeric values), a natural language description of the capability, an embedded capability intent value for the capability, and other data relating to the capability. In embodiments herein, each node may include both a capability intent value as well as one or more keywords within the capability natural language description, on top of other data or metadata for the capability. The hierarchical capabilities decision tree in an embodiment may identify child capability natural language descriptions or phrases therewithin as providing a greater specificity for a particular capability than its identified parent capability natural language description or phrases. For example, a parent capability natural language description phrase such as "passwords" may have two child capability natural language description phrases, including "Microsoft password," and "Outlook password," each providing a more specific example of the parent phrase "password."

Parent capability natural language descriptions or phrases may be separated from children capability natural language descriptions or phrases within the hierarchical capabilities decision tree by branches. Each level of the hierarchical capabilities decision tree may thus include one or more nodes identified as a child, and connected via a branch to one of the nodes in the previous level of the hierarchical capabilities decision tree. The connection may be a metadata or other data value linking the stored child capability data with the parent capability data within the natural language capability database 155. Each capability natural language description or phrase identified as a child in such a way within the hierarchical capabilities decision tree may include an identification of its parent node or parent capability natural language description/phrase.

The hardware processor 102 executing machine readable code instructions of the OTB AI productivity tool 150 may determine capability intent values associated with natural language descriptions of the gathered capabilities for each of a plurality of AI productivity tool-enablable software applications 111. These capability intent values are a mathematical representation of descriptors of the capability operations or services from various AI productivity tool-enablable software applications and may be represented by a mathematical value that is an embedded capability intent value in a multi-axis vector space that may be associated with a natural language description for that capability or capability intent. The hardware processor 102 may execute machine readable code instructions of the OTB AI productivity tool 150 to perform a cosine similarity search or comparison that compares a vectorized user query input intent value and vectorized capability intent values to determine the contextual similarity between the natural language description of the capability and the natural language user query input. This may be performed for several of the capability intent values to identify a capability intent value that most closely matches or correlates with the user query input value. In such a way, the hardware processor 102 executing code instructions for the OTB AI productivity tool 150 may take relevance and context of natural language within a user query input into account when determining a matching or correlating capability of an AI productivity tool enableable software application 111 that is most likely to address the user's intent within the user query input.

In another embodiment, in order to overcome the risk of data saturation, the hardware processor 102 executing machine readable code instructions for the query intent to capability determination module of the OTB AI productivity tool 150 may limit the number of comparisons made against the query input intent value based on relationships of capabilities identified within metadata and illustrated by the positions of the natural language descriptions of the capabilities, or phrases therewithin, as given in the hierarchical capabilities decision tree stored at the natural language capabilities database 155 and linked by parent-child relationship metadata or other data associated with the stored data for the respective capabilities. For example, the hardware processor 102 executing machine readable code instructions for the query intent to capability determination module of the OTB AI productivity tool 150 may determine, for each natural language capability at a first level of the hierarchical capabilities decision tree, a cosine semantic similarity search score that compares the vectorized user query input intent value and the capability intent values for the natural language descriptions of the capabilities at the first level.

In order to increase the accuracy of the above-described semantic search or comparison results, such as the cosine semantic similarity algorithm, the hardware processor 102 executing machine readable code instructions for the OTB AI productivity tool 150 in an embodiment may, for each compared user query input query input intent value and capability intent value at the first level, also perform a TF-IDF comparison of the natural language descriptions. The output of the semantic search comparison may then be weighted by the TF-IDF comparison for each natural language description of the capability compared to the user query input, via the hardware processor 102 executing machine readable code instructions of OTB AI productivity tool 150. The hardware processor 102 executing machine readable code instructions of the query intent to capability determination module of the OTB AI productivity tool 150 may then determine a parent best match capability having a highest TF-IDF weighted cosine semantic similarity search score among the natural language capabilities at the first level of the hierarchical capabilities decision tree. In such a way, the hardware processor 102 executing code instructions for the OTB AI productivity tool 150 may enhance semantic search performance by also considering critical keywords when determining a matching capability of an AI productivity tool enableable software application 111 as a best match capability that is most likely to operate as a capability intent action to address the user's intent within the user query input.

Instead of performing these determinations for each node of the second level of the hierarchical capabilities decision tree, the hardware processor 102 executing machine readable code instructions for the query intent to capability determination module of the OTB AI productivity tool 150 may determine a TF-IDF weighted cosine semantic similarity search score only for the children of the parent capability natural language description identified as the parent best match capability for the previous level of the hierarchical capabilities decision tree. Such a hierarchical capabilities decision tree for capabilities of AI productivity tool enableable software applications 111 on the information handling system may be pre-established for the OTB AI productivity tool 150 within the natural language capability database 155. Comparison of TF-IDF weighted cosine semantic similarity search scores or other TF-IDF weighted semantic similarity search scores, as performed via execution of machine readable code instructions of the query intent to capability determination module of the OTB AI productivity tool 150 by the hardware processor 102, to determine a keyword-sensitive statistical correlation value with the query intent value may be limited at each level of the hierarchical capabilities decision tree to children of the natural language description of the capability at the previous level having a capability intent value generating a highest parent TF-IDF weighted cosine semantic similarity search score in embodiments herein. In some embodiments, the TF-IDF weighted cosine semantic similarity search score for each child node may be further weighted by the TF-IDF weighted cosine semantic similarity search score for its parent.

In such a way, the hardware processor 102 executing machine readable code instructions of the query intent to capability determination module of the OTB AI productivity tool 150 may consistently narrow focus of comparisons between the query input intent value and the plurality of capability intent values to natural language descriptions of increasing specificity, while simultaneously considering importance of various keywords. The natural language capability for an AI productivity tool enableable software application 111 having the highest TF-IDF weighted cosine semantic similarity search score or highest parent-score and TF-IDF weighted cosine semantic similarity search score may then be identified, via execution of machine readable code instructions of the OTB AI productivity tool 150 by the hardware processor 102 as the capability having a highest statistical correlation and most likely to address the user's intended request within the natural language user query input. In such a way, embodiments of the hardware processor 102 executing code instructions for the query intent to capability module for the OTB AI productivity tool 150 may overcome or lessen the impacts of data saturation encountered by comparing the query input intent value to all capability intent values, thus decreasing consumption of processing resources, and may enhance semantic search performance by also considering critical keywords when determining a matching capability of an AI productivity tool enableable software application as a best match capability that is most likely to serve as a capability intent action to address the user's intent within the user query input.

In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 141, a base station transceiver 142, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of instructions to perform one or more computer functions.

The information handling system 100 may include main memory 103, (volatile (e.g., random-access memory, etc.), or static memory 105, nonvolatile (read-only memory, flash memory etc.) or any combination thereof), one or more hardware processing resources, such as a hardware processor 102 that may be a central processing unit (CPU), embedded controller (EC) 104, a graphics processing unit (GPU) 106, other hardware controllers, or any combination thereof. Additional components of the information handling system 100 may include one or more storage devices such as static memory 105 or drive unit 120. The information handling system 100 may include or interface with one or more communications ports for communicating with external devices, as well as an input/output (IO) device 116, a video/graphics display device 115, an audio microphone 118 for recording user communications, or any combination thereof. Portions of an information handling system 100 may themselves be considered information handling systems 100.

Information handling system 100 may include devices or modules that embody one or more of the hardware devices or hardware processing resources executing machine readable code instructions for one or more software or firmware systems and modules. The information handling system 100 may execute machine readable code instructions (e.g., software or firmware algorithms), parameters, and profiles 114 that may operate on servers or systems, remote data centers, or on-box in individual client information handling systems according to various embodiments herein. In some embodiments, it is understood any or all portions of machine readable code instructions (e.g., software or firmware algorithms), parameters, and profiles 114 may operate on a plurality of information handling systems 100. In a specific embodiment, code instructions for the OTB AI productivity tool 150, the universal user conversational interface software application 170, and one or more AI productivity tool enableable software applications 111 may execute locally at the information handling system 100, or on the box.

The information handling system 100 may include the hardware processor 102 such as a central processing unit (CPU) or other hardware processing resources. Any of the hardware processing resources may operate to execute machine readable code instructions 114 that are either firmware or software code. Moreover, the information handling system 100 may include memory such as main memory 103, static memory 105, and disk drive unit 120 (volatile (e.g., random-access memory, etc.), nonvolatile memory (read-only memory, flash memory etc.) or any combination thereof or other memory with computer readable medium 112 storing machine readable code instructions (e.g., software or firmware algorithms), parameters, and profiles 114 executable by the hardware processor 102, EC 104, GPU 106, or any other hardware processing device. The information handling system 100 may also include one or more buses 117 operable to transmit communications between the various hardware components such as any combination of various I/O devices 116 as well as between hardware processors 102, an EC 104, GPU 106 or other, the operating system (OS) 111, the basic input/output system (BIOS) 110, the wireless interface adapter 130, or a radio module 132, among other components described herein. In an embodiment, the hardware processor 102, EC 104, and/or GPU 106 may execute one or more bus drivers in order to transmit this data between the information handling system 100 and the input/output devices 116 described herein. As described herein, the information handling system 100 further includes a video/graphics display device 115. The video/graphics display device 115 in an embodiment may function as a liquid crystal display (LCD), an organic light emitting diode (OLED), a flat panel display, or a solid-state display. It is appreciated that the video/graphics display device 115 may be wired or wireless and may be an external video/graphics display device 115 that allows a user to increase the desktop area by extending the desktop in an embodiment.

A network interface device of the information handling system 100 may be wired or wireless such as shown with wireless interface adapter 130 that can provide wireless connectivity among devices such as with Bluetooth® or to a network 140, e.g., a wide area network (WAN), a local area network (LAN), wireless local area network (WLAN), a wireless personal area network (WPAN), a wireless wide area network (WWAN), or other network. In embodiments described herein, the wireless interface device 130 with its radio 132, RF front end 134 and antenna 136 is used to communicate with the network 140, via, for example, a Bluetooth® or Bluetooth® Low Energy (BLE) protocols, or other WPAN or WLAN protocols.

In an embodiment, a WAN, WWAN, LAN, and WLAN may each include an AP 141 or base station 142 used to operatively couple the information handling system 100 to a network 140 via a wireless interface adapter 130. In a specific embodiment, the network 140 may include macro-cellular connections via one or more base stations 142 or a wireless AP 141 (e.g., Wi-Fi), or such as through licensed or unlicensed WWAN small cell base stations 142. Connectivity may be via wired or wireless connection. For example, wireless network wireless APs 141 or base stations 142 may be operatively connected to the information handling system 100. Wireless interface adapter 130 may include one or more RF (RF) subsystems (e.g., radio 132) with transmitter/receiver circuitry, modem circuitry, one or more antenna RF (RF) front end circuits 134, one or more wireless controller circuits, amplifiers, antennas 136 and other circuitry of the radio 132 such as one or more antenna ports used for wireless communications via multiple radio access technologies (RATs). The radio 132 may communicate with one or more wireless technology protocols.

In an embodiment, the wireless interface adapter 130 may operate in accordance with any wireless data communication standards. To communicate with a wireless local area network, standards including IEEE 802.11 WLAN standards (e.g., IEEE 802.11ax-2021 (Wi-Fi 6E, 6 GHZ)), IEEE 802.15 WPAN standards, WiMAX, WWAN such as 3GPP or 3GPP2, Bluetooth® standards, proprietary RF protocol, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax/be including Wi-Fi 6, Wi-Fi 6e, and the emerging Wi-Fi 7 standard. It is understood that any number of available channels may be available in WLAN under the 2.4 GHz, 5 GHZ, or 6 GHz bands which may be shared communication frequency bands with WWAN protocols or Bluetooth® protocols in some embodiments. Wireless interface adapter 130 may connect to any combination of macro-cellular wireless connections including 2G, 2.5G, 3G, 4G, 5G or the like from one or more service providers. Utilization of RF communication bands according to several example embodiments of the present disclosure may include bands used with the WLAN standards and WWAN carriers which may operate in both licensed and unlicensed spectrums. The wireless interface adapter 130 can represent an add-in card, wireless network interface module that is integrated with a main board of the information handling system 100 or integrated with another wireless network interface capability, or any combination thereof.

In some embodiments, hardware processor or hardware controllers executing software, firmware, or dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software machine readable code instructions executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a computer-readable medium that includes computer-readable code instructions, parameters, and profiles 114 or receives and executes instructions, parameters, and profiles 114 responsive to a propagated signal, so that a hardware device connected to a network 140 may communicate voice, video, or data over the network 140. Further, the machine readable code instructions 114 may be transmitted or received over the network 140 via the network interface device or wireless interface adapter 130.

The information handling system 100 may include a set of instructions 114 that may be executed to cause the computer system to perform any one or more of the methods or computer-based functions disclosed herein. For example, machine readable code instructions 114 may be executed by a hardware processor 102, GPU 106, EC 104 or any other hardware processing resource and may include software agents, or other aspects or components used to execute the methods and systems described herein. Various software modules comprising application machine readable code instructions 114 may be coordinated by an OS 111, and/or via an application programming interface (API) include a unified device API described herein. An example OS 111 may include Windows®, Android®, and other OS types. Example APIs may include Win 32, Core Java API, or Android APIs.

In an embodiment, the information handling system 100 may include a disk drive unit 120. The disk drive unit 120 and may include machine-readable code instructions, parameters, and profiles 114 in which one or more sets of machine-readable code instructions, parameters, and profiles 114 such as firmware or software can be embedded to be executed by the hardware processor 102 or other hardware processing devices such as a GPU 106 or EC 104, or other microcontroller unit to perform the processes described herein. Similarly, main memory 103 and static memory 105 may also contain a computer-readable medium for storage of one or more sets of machine-readable code instructions, parameters, or profiles 114 described herein. The disk drive unit 120 or static memory 105 also contain space for data storage. Further, the machine-readable code instructions, parameters, and profiles 114 may embody one or more of the methods as described herein. In a particular embodiment, the machine-readable code instructions, parameters, and profiles 114 may reside completely, or at least partially, within the main memory 103, the static memory 105, and/or within the disk drive 120 during execution by the hardware processor 102, EC 104, or GPU 106 of information handling system 100.

Main memory 103 or other memory of the embodiments described herein may contain computer-readable medium (not shown), such as RAM in an example embodiment. An example of main memory 103 includes random access memory (RAM) such as static RAM (SRAM), dynamic RAM (DRAM), non-volatile RAM (NV-RAM), or the like, read only memory (ROM), another type of memory, or a combination thereof. Static memory 105 may contain computer-readable medium (not shown), such as NOR or NAND flash memory in some example embodiments. The applications and associated APIs, for example, may be stored in static memory 105 or on the disk drive unit 120 that may include access to a machine-readable code instructions, parameters, and profiles 114 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 107 (a.k.a. a power supply unit (PSU)). The PMU 107 may include a hardware controller and executable machine-readable code instructions to manage the power provided to the components of the information handling system 100 such as the hardware processor 102 and other hardware components described herein. The PMU 107 may control power to one or more components including the one or more drive units 120, the hardware processor 102 (e.g., CPU), the EC 104, the GPU 106, a video/graphic display device 115, or other wired I/O devices 116 and other components that may require power when a power button has been actuated by a user. In an embodiment, the PMU 107 may monitor power levels and be electrically coupled to the information handling system 100 to provide this power. The PMU 107 may be coupled to the bus 117 to provide or receive data or machine-readable code instructions. The PMU 107 may regulate power from a power source such as the battery 108 or AC power adapter 109. In an embodiment, the battery 108 may be charged via the AC power adapter 109 and provide power to the components of the information handling system 100, via wired connections as applicable, or when AC power from the AC power adapter 109 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 105 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
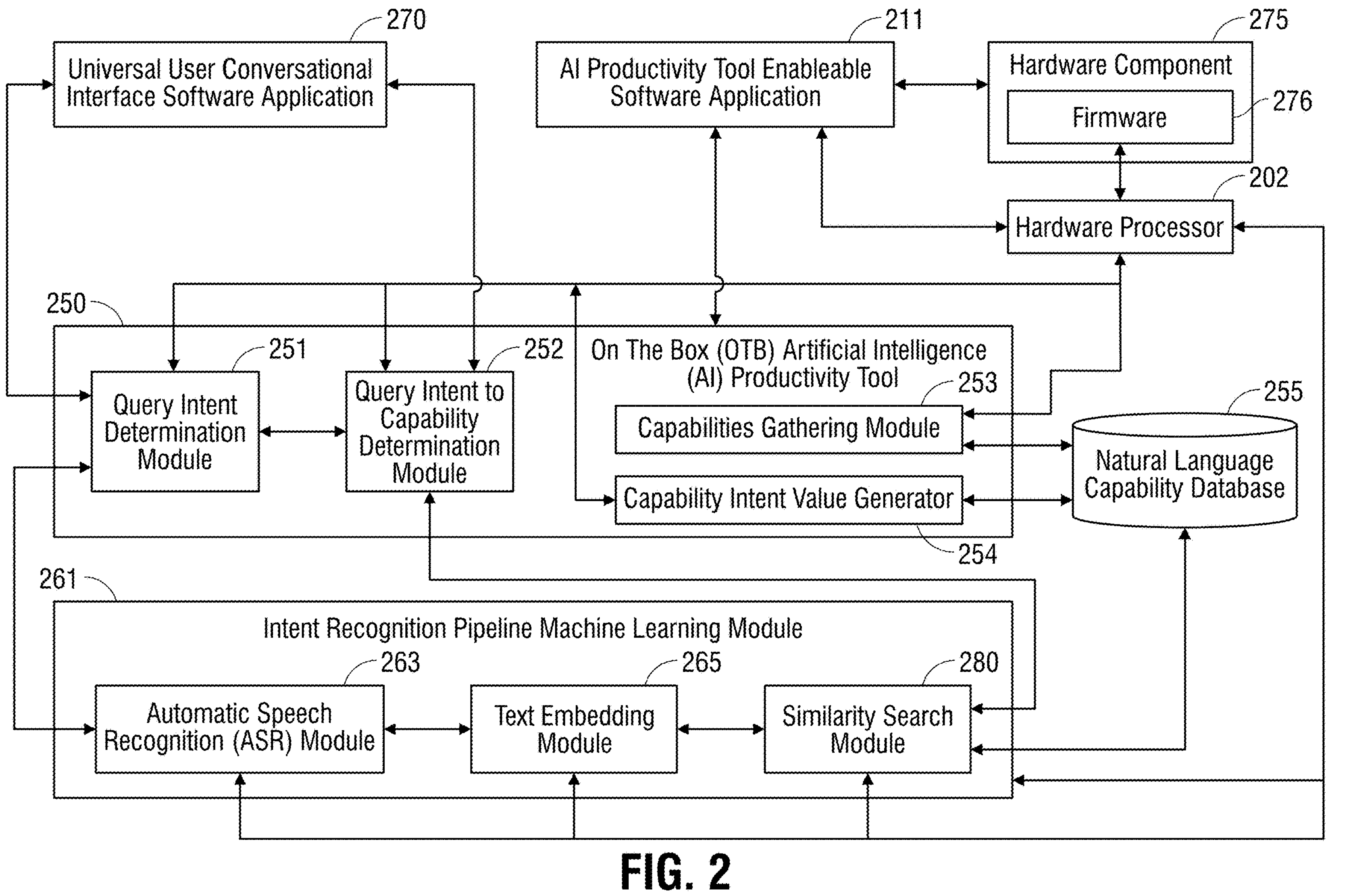
FIG. 2 is a block diagram illustrating computer readable code instructions for an OTB AI productivity tool executable on an information handling system for matching a determined query intent value for a user's query input to a registered capability intent value for an AI productivity tool-enablable software application according to an embodiment of the present disclosure.

FIG. 2 is a block diagram illustrating computer readable code instructions for an on the box (OTB) artificial intelligence (AI) productivity tool for correlating a determined query intent value for a user's query input to a registered capability intent value for an AI productivity tool-enablable software application according to an embodiment of the present disclosure. The AI productivity tool enableable software application 211 in an embodiment may then execute a responsive capability for hardware or software operations, software services, or generating a response to meet the chatbot input query. A manufacturer of edge devices, such as personal or enterprise computers, may develop and install on individual edge device information handling systems machine readable code instructions for an OTB AI productivity tool 250 that employs one or more locally executed machine learning models, such as 263, 265, or 280, to optimize user productivity and performance with the information handling system using artificial intelligence methodologies. Examples of artificial intelligence methodologies includes ML model algorithms used with chatbots, such as universal user conversational interface software application 270 to simulate conversations between the information handling system executing machine readable code instructions of the AI productivity tool enableable software application 211 and the user, via the OTB AI productivity tool 250 to execute one or more capabilities for an application software service, response or other function in response to a user query input. For example, a response to a user query via OTB AI productivity tool 250 may trigger processes of one or more AI productivity tool enableable software applications 211 in embodiments herein.

The OTB AI productivity tool 250 in an embodiment may receive, via a universal user conversational interface software application 270 or other interface, a voice or text input from a user, described herein as a user query input, that requests actions or services of various software applications in natural language. A hardware processor 202 executing code instructions of the OTB AI productivity tool 250 in an embodiment may match these received user queries, or user query inputs to known capabilities of one or more of the AI productivity tool-enableable software applications 211 through execution by the hardware processor 202 of machine readable code instructions for one or more natural language processing machine learning models. AI productivity tool enableable software application 211 may have or publish a list of recognized "capabilities" or functionalities that it may perform during execution of such an AI productivity tool enableable software application 211 in response to a query input received and processed by the OTB AI productivity tool 250 into a query intent vector value. The capabilities are provided with text descriptors, such as a natural language description of the capability, which may be processed into vectorized capability intent values in a multi-axis vector space such that these intent value mathematical representations of a query and a capability may be correlated by a similarity matching algorithm to select a capability responsive to an input query from a user.

This process includes gathering, either in real-time or prior to execution of the OTB AI productivity tool 250, via the capabilities gathering module 253, capabilities associated with each of a plurality of AI productivity tool-enablable software applications 211. These capabilities (also called capability intents and having capability intent values from natural language descriptions of each capability) may describe those functionalities of each of the AI productivity tool-enablable software applications 211, that may be used when interfacing with the OTB AI productivity tool 250. These natural language descriptions of the capabilities for the AI productivity tool-enableable software applications 211 may be stored along with capability intent values as well as other capability-related data within a natural language capability database 255 for comparison to received user query inputs, for example, in order to identify a capability most likely to address a user's request within the received user query inputs.

As described herein, and specifically in greater detail below with respect to FIG. 3, the natural language descriptions of capabilities for the AI productivity tool enableable software applications 211 in an embodiment may be organized into a hierarchical capabilities decision tree stored at the natural language capabilities database 255 that maps logical parent-child relationships between and among the plurality of natural language descriptions that are pre-established by an information technology decision maker (ITDM) or other person. Each node of this hierarchical capabilities decision tree in an embodiment may include, within metadata or other data, a capability name, capability identification (ID) (e.g., in alphanumeric values), and a natural language description of the capability as well as an embedded capability intent vector value generated for the capability. In some embodiments, each capability node may include this capability intent value as well as one or more keywords of descriptors within the capability natural language description stored with the capability node. Further, each capability node may include metadata or data indicating a link with an associated parent or child in the hierarchical capabilities decision tree at the natural language capability database 255. The hierarchical capabilities decision tree in an embodiment may identify child capability natural language descriptions or phrases therewithin as providing greater specificity than its identified parent capability natural language description or phrases within branches of the hierarchical capabilities decision tree. Further, as a new capability is added it is pre-established at a location within this hierarchical capabilities decision tree and provided with metadata or other data indicating parent or child relationships in embodiments herein. For example, a parent capability natural language description phrase such as "passwords" may have two child capability natural language description phrases, including "Microsoft password," and "Outlook password," each providing a more specific example of the parent phrase "password." Each of the child nodes will have metadata or other data linkage to the parent "passwords," but not to one another.

Parent capability natural language descriptions or phrases may be separated from children capability natural language descriptions or phrases within the hierarchical capabilities decision tree stored at the natural language capabilities database 155 in an embodiment by branches. Each level of the hierarchical capabilities decision tree may thus include one or more nodes identified as a child, and connected via a branch to one of the parent nodes in the previous level of the hierarchical capabilities decision tree. Each capability natural language description or phrase identified as a child in such a way within the hierarchical capabilities decision tree may include an identification of its parent node or parent capability natural language description/phrase within the metadata or other data stored at the natural language capabilities database 255.

The hardware processor 202 executing machine readable code instructions for a capability intent value generator 254 of the OTB AI productivity tool 250 may determine capability intent values associated with natural language descriptions of the gathered capabilities for each of a plurality of AI productivity tool-enablable software applications 211. These capability intent values are a mathematical representation of the natural language descriptions of capability operations or services from various AI productivity tool-enablable software applications 211 in an embodiment. These capability intent values may be represented by a mathematical value in a multi-axis vector space that may be associated with the natural language description for that capability or intent. Generating such capability intent values as semantic vector intent values may be a first step in a natural language processing method to determine a capability corresponding to and responsive to the user's intent or requested action within a user query input that takes into account the context or semantics of the words used within the user query input. In an embodiment, the capabilities may also be associated with an identification (ID) such as an alphanumeric ID that may be stored at the capability node with a capability name for each capability within a natural language capability database 255.

In an embodiment, the natural language capability database 255 may store a plurality of capabilities in capability nodes of a hierarchical capabilities decision tree associated with each of a plurality of AI productivity tool-enablable software applications 211 with a name, capability ID, natural language descriptors, and a capability intent value, as well as metadata and data for parent/child relationships or other capability-related information at each capability node in some embodiments. These capabilities stored at the natural language capability database 255 may include any input and output capabilities provided by the AI productivity tool-enablable software applications 211 being executed by the hardware processor 202 or any other hardware processing devices (104 or 106 of FIG. 1). For example, an AI productivity tool-enablable software application 211 may include a word processing application such as Microsoft® Word® that may receive input (e.g., via voice at a microphone 118 or text via a keyboard 116 of FIG. 1) and provide output via text. Still further, other examples of an AI productivity tool-enablable software application 211 may include an updating software, virus protection software, and setting optimization software such as Dell® SupportAssist® module executable by the hardware processor or other hardware processing resource of the information handling system. With SupportAssist® a user may provide input via, for example, the microphone (118 of FIG. 1) requesting information related to a setting associated with the information handling system. Thus, capabilities of SupportAssist® may include virus protection capabilities, setting manipulation capabilities, and software updating capabilities that may each be stored at the natural language capability database 255.

Even further, examples of an AI productivity tool-enablable software application 211 may include Dell® Display®/Peripheral Manager®. The Dell® Display®/Peripheral Manager® may have capabilities that include optimization of screen resolution, refresh rates, and gamma correction as well as webcam settings, mouse settings, keyboard settings, stylus settings, microphone settings, and trackpad settings, among other settings and connections associated with the wired or wireless input/output devices. Again, these capabilities associated with the execution of the Dell® Display®/Peripheral Manager® software may have capability intent values and a capability identifier stored at the natural language capability database 255 as described herein. It is appreciated that the AI productivity tool-enablable software application 211 may include, for example, Dell® Trusted Device® software, a remediation Dell® APEX Managed Device Service (AMDS)® software, Alienware Command Center (AWCC)® software, among others. Some AI productivity tool-enablable software applications 211 may even be subagents operating locally on the box of the information handling system but have remote access to a larger software application executing at a cloud based server location for providing software services in some embodiments herein.

These capabilities for executing responsive capability intent action by one or more AI productivity tool enablable software applications 211 may be registered with the OTB AI productivity tool 250 in an embodiment for establishing capability intent values for these capabilities such that chat user query input intent values and the natural language of the user query input may be correlated with one or more capability intent values weighted with TF-IDF comparison of its natural language description for registered capabilities, as described herein. For example, in an embodiment in which the AI productivity tool enableable software application 211 is software application for optimizing performance of hardware components at the information handling system, such capabilities may include adjusting settings or configurations for various hardware components. As another example, in an embodiment in which the AI productivity tool enableable software application 211 optimizes performance of other software applications, such capabilities may include automatically downloading and installing updates for such AI productivity tool enableable software applications 211. In yet another example, in an embodiment in which the AI productivity tool enableable software application 211 is one of several software applications routinely executing on the information handling system, and optimized by such an OTB AI productivity tool 250, such capabilities may include automatically generating and transmitting e-mails or text messages, automatically scheduling meetings, or generating chatbot or other user interface responses. These capabilities may be registered, associated with a specific AI productivity tool enableable software application 211, and stored with capability name, capability ID, natural language descriptor, capability intent value, or other data in capability nodes in a hierarchical capabilities decision tree at the natural language capability database 255 in a embodiments herein.

Each of the capabilities stored at the natural language capability database 255 may have a description with text descriptors, may be associated with a unique ID, and may have a capability intent value as well as any metadata or other data associated with the capability such as parent/child relationship designations in an embodiment. Upon registration of a given capability by the AI productivity tool enableable software application 211 in an embodiment, a hardware processor 202 for the information handling system may execute machine readable code instructions for one or more text embedding algorithms to generate a multi-dimensional vector capability intent value for that capability that, for example, may be based on text descriptors for that capability. Each of these capability intent values for association with these capabilities may also be associated with an ID such as an alphanumeric ID that may identify, uniquely, these capabilities at capability nodes in the natural language capability database 255, for example. These capability intent values may later be used to determine which of the capabilities a user intends to invoke or execute within a received user query input based, at least in part, on semantic similarity with a query intent value, as described herein.

Upon determination of a capability intent value for each of the gathered or registered AI productivity tool enableable software application capabilities, the OTB AI productivity tool 250 may begin processing received user query inputs from the universal conversational interface software application 270 or other interface for execution of capabilities for an application software service, response or other function corresponding to one of these capability intent values. In an example embodiment, a user may provide a user query input in the form of text or voice data (e.g., via IO device 116, or microphone 118 of FIG. 1) to a universal user conversational interface software application 270, executing machine readable code instructions as a chatbot with the OTB AI productivity tool 250 to simulate a conversation between the user and the AI productivity tool enableable software application 211. When a user provides a user query input in the form of text or voice data (e.g., via IO device 116, or microphone 118 of FIG. 1) to the universal user conversational interface software application 270, the hardware processor 202 executing machine-readable code instructions of the OTB AI productivity tool 250 in an embodiment may orchestrate assessment of the user's intended goals within the user query input (e.g., what the user wishes to achieve with this communication) with determination of a query input intent value, and identify one or more capabilities associated with the AI productivity tool enableable software application 211 having a correlating capability intent value and that is capable of executing a response to this user query input intent. Further, the OTB AI productivity tool 250 may initiate performance of one or more tasks employing those capabilities to achieve the user-intended results to the user query input.

This orchestration in an embodiment may begin with the hardware processor 202 executing machine-readable code instructions of the query intent determination module 251 to receive the user query input via microphone, image, or text input, and initiate execution of machine readable code instructions for an intent recognition pipeline machine learning module 261. In an embodiment, the hardware processor 202 executing machine-readable code instructions for the intent recognition pipeline machine learning module 261 may further orchestrate any combination of a plurality of machine learning modules (e.g., 263, 265, or 280) to process the audio or text input to determine the user's intended goal or query intent within the received text or voice data of the user query input. During operation for example, the hardware processor 202 executing machine-readable code instructions of the query intent determination module 251 may load one or more machine learning models such that, for example, the text or voice input from the user may be processed through a speech recognition model 263 and/or processed through any of a plurality of natural language models (e.g., 265 or 280) or other ML models in order to determine a text of a user's input query or an intent value of the user's input query. For example, an automatic speech recognition (ASR) module 263, a text embedding module 265, or a similarity search module 280 that work in various combinations with one another to detect a user's audio speech input, conversion to text or detecting text, and detecting an intent, represented by generating a query intent vector value from the text of the user query input received from the universal user conversational interface software application 270 or other interface such as one specific to an AI productivity tool enableable software application.

Further, the hardware processor 202 executing machine-readable code instructions of an intent recognition pipeline machine learning module 261 may orchestrate the interplay between each of the ASR module 263, text embedding module 265, and similarity search module 280 to establish a query intent vector value in a multi-axis vector space defined with these machine learning models and correlate that query intent value with a corresponding capability intent value in an embodiment. Several text embedding algorithms may be used in various embodiments herein in order to provide a vectorized mathematical representation of semantic understanding for a user query input or for a capability described in natural language. For example, the text embedding module 265 may employ a Latent Semantic Analysis (LSA) or Latent Dirichlet allocation (LDA) which may define how close each of the observed terms in the received user query input are to various synonyms. As another example, the text embedding module 265 may employ a Word2Vec algorithm, which includes a neural network trained to understand which terms or phrases should be considered closer or further away from certain synonyms or antonyms. As yet another example, the text embedding module 265 may employ a fully recurrent neural network trained to consider the order of terms within the received user query input or the natural language descriptors of the capabilities for the AI productivity tool enableable software applications 211.

In an embodiment in which the user provides text data to the AI productivity tool enableable software application 211, such an intent recognition pipeline machine learning module 261 may truncate this process to exclude processes of the ASR module 263. The hardware processor 202 executing machine-readable code instructions of the intent recognition pipeline machine learning module 261 in an embodiment may apply the text embedding module 265 to generate a query intent value as described and then return the output query intent value of the text embedding module 265 to the query intent to capability determination module 252. The query intent to capability module may utilize the similarity search module 280 for a correlation between the query intent value received and a stored capability intent value. Such a similarity search module 280 in an embodiment may perform a semantic similarity search or a weighted semantic similarity search that includes a comparison between the received user query input and a subset of the gathered natural language descriptions of capabilities stored in capability nodes the natural language capabilities database 255 based on branches within the hierarchical capabilities decision tree, as described in greater detail below with respect to FIGS. 3-6.

In order to increase the accuracy of the above-described semantic search or comparison results, such as the cosine semantic similarity algorithm, the hardware processor 202 executing machine readable code instructions for the similarity search module 280 in an embodiment may, for each compared user query input and natural language capability, also perform a TF-IDF comparison. The output of the semantic search comparison may then be weighted by the TF-IDF comparison for each natural language capability compared to the user query input, via the hardware processor 202 executing machine readable code instructions of the similarity search module 280. The hardware processor 202 executing machine readable code instructions of the query intent to capability determination module 252 of the OTB AI productivity tool 250 may then determine a parent best match capability having a highest TF-IDF weighted cosine semantic similarity search score among the natural language capabilities. In such a way, the hardware processor 202 executing code instructions for the OTB AI productivity tool 250 may enhance semantic search performance by also considering critical keywords when determining a matching capability of an AI productivity tool enableable software application 211 that is most likely to address the user's intent within the user query input.

For example, the detected intent, having a query intent value in a multi-axis vector space, may include natural language such as "decrease display brightness," "speed up my application," or "send a text message" may be associated with a known capability or functionality of AI productivity tool enableable software application 211 at the information handling system. More specifically, the query intent "decrease display brightness" may be associated with a capability for adjusting settings or configurations for a display device (115 of FIG. 1), based on semantic similarity correlation or blended TF-IDF and semantic similarity correlation between a query intent value and a capability intent value as determined by the similarity search module 280, as well as assessment of natural language terms in the user query input and description of the capabilities. As another example, the query intent "speed up my application" may be associated with a capability associated with the AI productivity tool enableable software application 211 for automatically downloading and installing updates for such AI productivity tool enableable software application 211, based on similarity correlation between a query intent value and a capability intent value as determined by the similarity search module 280. In yet another example, the query intent "send a text message" may be associated with a capability of the AI productivity tool enableable software application 211 to automatically generate and transmit text messages, based on similarity correlation between a query intent value and a capability intent value as determined by the similarity search module 280. As described above, these "capabilities" may be registered and associated with a specific AI productivity tool enableable software application 211 at the natural language capability database 255 in an embodiment.

Upon identification of a capability that addresses the determined query "intent" of the user within the received user query input, the hardware processor 202 executing machine-readable code instructions of the OTB AI productivity tool 250 may direct execution of one or more processes at the AI productivity tool enableable software application 211, via the universal user conversational interface software application 270 associated with that capability. For example, the hardware processor 202 executing machine-readable code instructions of the query intent to capability determination module 252 may directly instruct the AI productivity tool enableable software application 211 to undertake the identified "capability." In such a way, the OTB AI productivity tool 250 may orchestrate a plurality of machine learning modules via an intent recognition pipeline machine learning module 261 to determine a query intent from a received user query input with a generated semantic query intent vector value as well as use the natural language of the user query input in embodiments herein. Further, the OTB AI productivity tool 250 may orchestrate a plurality of machine learning modules via an intent recognition pipeline machine learning module 261 to identify a corresponding vectorized capability intent value having threshold TF-IDF weighted semantic similarity to the query intent value and natural language of the user query input to select a capability of the AI productivity tool enableable software applications 211 to execute as a capability intent action for an operation, software service, response, or other function responsive to the user's query input.

Figure 3:
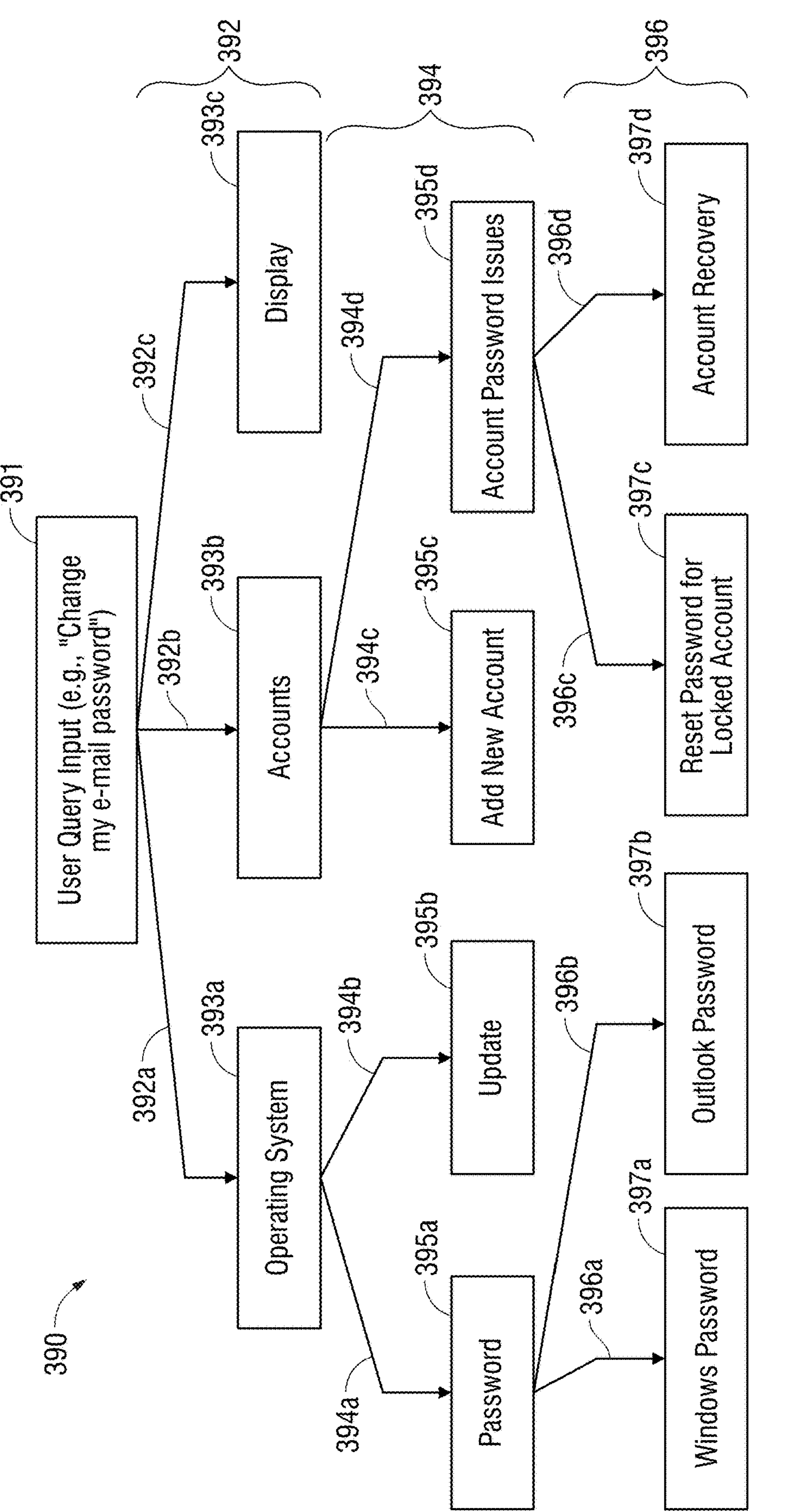
FIG. 3 is a block diagram illustrating a hierarchical capabilities decision tree defining parent-child relationships among a plurality of natural language phrases of AI productivity tool enableable software application capabilities in capability nodes for selection by execution of computer readable code instructions for an OTB AI productivity tool according to an embodiment of the present disclosure.

FIG. 3 is a block diagram illustrating a hierarchical capabilities decision tree defining parent-child relationships in capability nodes among a plurality of natural language phrases given within a plurality of natural language descriptions of AI productivity tool enableable software application capabilities such as within a natural language capability database according to an embodiment of the present disclosure. As described herein, the natural language descriptions of capabilities for the AI productivity tool enableable software applications in an embodiment may be organized into a hierarchical capabilities decision tree 390 that maps the capability nodes and is pre-established for logical parent-child relationships between and among the plurality of natural language descriptions of capabilities in those capability nodes in an embodiment.

Each capability node of this hierarchical capabilities decision tree 390 in an embodiment may have the same data fields, including a capability name, an associated AI productivity tool enableable software application, capability identification (ID) (e.g., in alphanumeric values), and a natural language description or phrase therewithin of the capability. Further, each node may include metadata or other data indicating parent/child relationships as well as other capability related information in embodiments herein. Still further, the nodes of the hierarchical capabilities decision tree 390 may include an embedded semantic capability intent value generated or established for each capability node.

In an example embodiment of FIG. 3, an initial capability node 391 in an embodiment may include a natural language description phrase of a query input and may also include a generated query intent value generated from the natural language of the query received via either an audio input or text input in example embodiments. In an example embodiment, the hierarchical capabilities decision tree 390 includes three example nodes 393*a*, 393*b*, and 393*c* at a first node level 392. For example, a first capability node 393*a* in an embodiment may include a natural language description phrase of "Operating System," and may also include a capability name, and a capability ID as well as an associated capability intent value and data or metadata designating nodes 395*a* and 395*b* as child nodes. In yet another example, a capability node 393*b* in an embodiment may include a natural language description phrase of "accounts," and may also include a capability name, a capability ID, and an associated capability intent value. Capability node 393*b* may have designation of child nodes 395*c* and 395*d*. In still another example, a capability node 393*c* in an embodiment may include a natural language description phrase of "display," and may also include a capability name, a capability ID, and an associated capability intent value with no designated child nodes.

As yet another example, a capability node 395*a* at a second level 394 in an embodiment may include a natural language description phrase of "password," and may also include a capability name, a capability ID, and associated capability intent value as well as designation of child nodes 397*a* and 397*b* and parent 393*a*. In yet another example, a capability node 395*b* of second level 394 in an embodiment may include a natural language description phrase of "update," and may also include a capability name, a capability ID, and associated capability intent value with no designation of child nodes and designation for a parent capability node 393*a*. For another example, a capability node 395*c* in an embodiment may include a natural language description phrase of "add new account," and may also include a capability name, a capability ID, associated capability intent value with no designation of child nodes and designation for a parent capability node 393*b*. In another example, a capability node 395*d* of second level 394 in an embodiment may include a natural language description phrase of "account password issues," and may also include a capability name, a capability ID, associated capability intent value, and designation of child nodes 397*c* and 397*d* and designation for a parent capability node 395*d*.

Still another example shows a capability node 397*a* of third level 396 in an embodiment including a natural language description phrase of "windows password," and may also include a capability name, and a capability ID, and associated capability intent value with no designation of child nodes and designation for a parent capability node 395*a*. In yet another example, a capability node 397*b* of third level 396 in an embodiment may include a natural language description phrase of "Outlook password," and may also include a capability name, a capability ID, and associated capability intent value with no designation of child nodes and designation for a parent capability node 395*a*. As yet another example, a capability node 397*c* in third level 396 in an embodiment may include a natural language description phrase of "reset password for locked account," and may also include a capability name, a capability ID, and associated capability intent value with no designation of child nodes and designation for a parent capability node 395*d*. In yet another example, a capability node 397*d* in third level 396 in an embodiment may include a natural language description phrase of "account recovery," and may also include a capability name, a capability ID, and associated capability intent value with no designation of child nodes and designation for a parent capability node 395*d*. In some embodiments, each of the nodes 393*a*, 393*b*, 393*c*, 393*d*, 395*a*, 395*b*, 395*c*, 395*d*, 397*a*, 397*b*, 397*c*, and 397*d* may further include the associated capability intent value, as well as one or more keywords within the capability natural language description and other capability related data.

The hierarchical capabilities decision tree 390 described with reference to FIG. 3 is only one example that includes a handful of natural language descriptions for capabilities, and it is contemplated that other embodiments may include any number of such natural language descriptions for capabilities, as dependent upon the number of natural language descriptions of capabilities for a plurality of AI productivity tool enableable software application that are gathered and stored within the natural language capabilities database and organized within the hierarchical capabilities decision tree 390 for use by an OTB AI productivity tool to determine responsive capability intent actions among capabilities of one or more AI productivity tool enableable software applications.

The hierarchical capabilities decision tree 390 in an embodiment may identify child capability natural language descriptions or phrases therewithin as providing greater specificity than its identified parent capability natural language description or phrases. For example, a query input capability node 391 may include a natural language description phrase such as "change my email password" which may correlate with a child capability node 395*a* for "password" after comparison across parent nodes 393*a*, 393*b*, and 393*c* in the first level 392. A parent capability node 393*a* for a capability natural language description phrase such as "operating system" may have two child nodes 395*a* and 395*b* for capability natural language description phrases, including "password," and "update," respectively, with each child capability node 395*a* and 395*b* providing a more specific example of the parent capability node 393*a* phrase "operating system." Thus, while correlation may not be strong with parent capability node 393*a* for "Operating system" it may be stronger than for nodes 393*b* for "accounts" and 393*c* for "display."

Child capability node 395*a* at level two 394 may further have two child nodes 397*a* and 397*b* at third level 396 for capability natural language description phrases, including "Microsoft password," and "Outlook password," respectively, with each child capability node 397*a* and 397*b* providing a more specific example of the parent capability node 395*a* phrase "password" in an embodiment. At this point, semantic or TF-IDF weighted semantic similarity comparison to child nodes of parent nodes 393*b* and 393*c* may not be assessed due to higher correlation of capability node 393*a* to "operating system" and particularly high correlation to its child capability node 395*a* for "password."

As another example, a parent capability node 395*d* for a capability natural language description phrase such as "account password issues" may have two child nodes 397*c* and 397*d* for capability natural language description phrases, including "reset password for locked account," and "account recovery," respectively, with each child capability node 397*c* and 397*d* providing a more specific example of the parent capability node 395*a* phrase "account password issues." In yet another example, a parent capability node 393*b* for a capability natural language description phrase such as "accounts" may have two child nodes 395*c* and 395*b* for capability natural language description phrases, including "add new account," and "account password issues," respectively, with each child capability node 395*c* and 395*d* providing a more specific example of the parent capability node 393*b* phrase "accounts." In still another example, a query input capability node 391 may search down tree branch for parent capability node 393*b* if the query natural language description phrase relates to an account issue from among the three parent nodes 393*a*, 393*b*, and 393*b* on the first level 392 for capability natural language description phrases, including "Operating System," and "account," and "display," respectively.

Parent nodes for capability natural language descriptions or phrases may be separated from child nodes for capability natural language descriptions or phrases within the hierarchical capabilities decision tree 390 in an embodiment by branches representing reciprocal metadata or other data designations at each parent/child node combination of the parent child node relationship within the hierarchical capabilities decision tree 390 in embodiments herein. Each successive level 392, 394 and 396 of the hierarchical capabilities decision tree 390 may thus include one or more nodes identified as a child to a parent node in the previous level, and connected via a branch to one of the nodes in the previous level of the hierarchical capabilities decision tree 390. Each capability natural language description or phrase identified as a child node with a capability ID, capability name and associated capability intent value within the hierarchical capabilities decision tree 390 may also include an identification for its parent node or parent capability natural language description/phrase as well as identification for its child node, if any, or any child capability natural language description/phrase.

For example, in the first level 392, the first level parent capability node 393*a* may include an identification of its child nodes 395*a* and 395*b* and may be linked for comparison to a query input 391 for comparison 392*a*. As another example, in the first level 392, the first level parent capability node 393*b* may include an identification of its child nodes 395*c* and 395*d* and may be linked for comparison to a query input 391 for comparison 392*b*. In yet another example, in the first level 392, with the parent capability node 393*c* may include an identification no child nodes and may be linked for comparison to a query input 391 for comparison 392*c*.

Such a comparison at the parent nodes 393*a*, 393*b*, and 393*c* for correlation of the query input to capability nodes at the first level of the hierarchical capabilities decision tree 390 may determine further comparison to capability nodes down a particular branch of the hierarchical capabilities decision tree 390 is warranted and mitigate a need to continue comparisons down other branches of the hierarchical capabilities decision tree 390. For example, in the second level 394, the child capability node 395*a* may include an identification of its parent capability node 393*a* as well as child nodes 397*a* and 397*b*, and may be connected to the parent capability node 393*a* via branch 394*a*. In yet another example, in the second level 394, the child capability node 395*b* may include an identification of its parent capability node 393*a*, and may be connected to the parent capability node 393*a* via branch 394*b*. In another example, in the second level 394, the child capability node 395*c* may include an identification of its parent capability node 393*b*, and may be connected to the parent capability node 393*b* via branch 394*c*. As yet another example, in the second level 394, the child capability node 395*d* may include an identification of its parent capability node 393*b*, and may be connected to the parent capability node 393*b* via branch 394*d.*

Proceeding further down the branches in yet another example to the third level 396, the child capability node 397*a* may include an identification of its parent capability node 395*a*, and may be connected to the parent capability node 395*a* via branch 396*a*. As still another example, in the third level 396, the child capability node 397*b* may include an identification of its parent capability node 395*a*, and may be connected to the parent capability node 395*a* via branch 396*b*. In yet another example, in the third level 396, the child capability node 397*c* may include an identification of its parent capability node 395*d*, and may be connected to the parent capability node 395*d* via branch 396*c*. In a final example, in the third level 396, the child capability node 397*d* may include an identification of its parent capability node 395*d*, and may be connected to the parent capability node 395*d* via branch 396*d.*

For the example input query 391 for "change my email password" and similarity comparison search may not proceed down branches 394*c*, 394*d*, 396*c*, and 396*d* upon determining a higher correlation with parent capability node 393*a* for "operating system" than parent nodes 393*b* for "accounts" and 393*c* for "display." Instead, with the keyword e-mail, the TF-IDF weighted semantic similarity comparison search may be focused to branches 394*a*, 394*b*, 396*a* and 396*b* in example embodiments herein. The shown hierarchical capabilities decision tree 390 is a limited example but it is contemplated that such a hierarchical capabilities decision tree 390 may accommodate more efficiently many more capability nodes than a flat semantic similarity comparison search across all available capability nodes for a plurality of AI productivity tool enableable software applications executing on an information handling system in embodiments herein.

Figure 4:
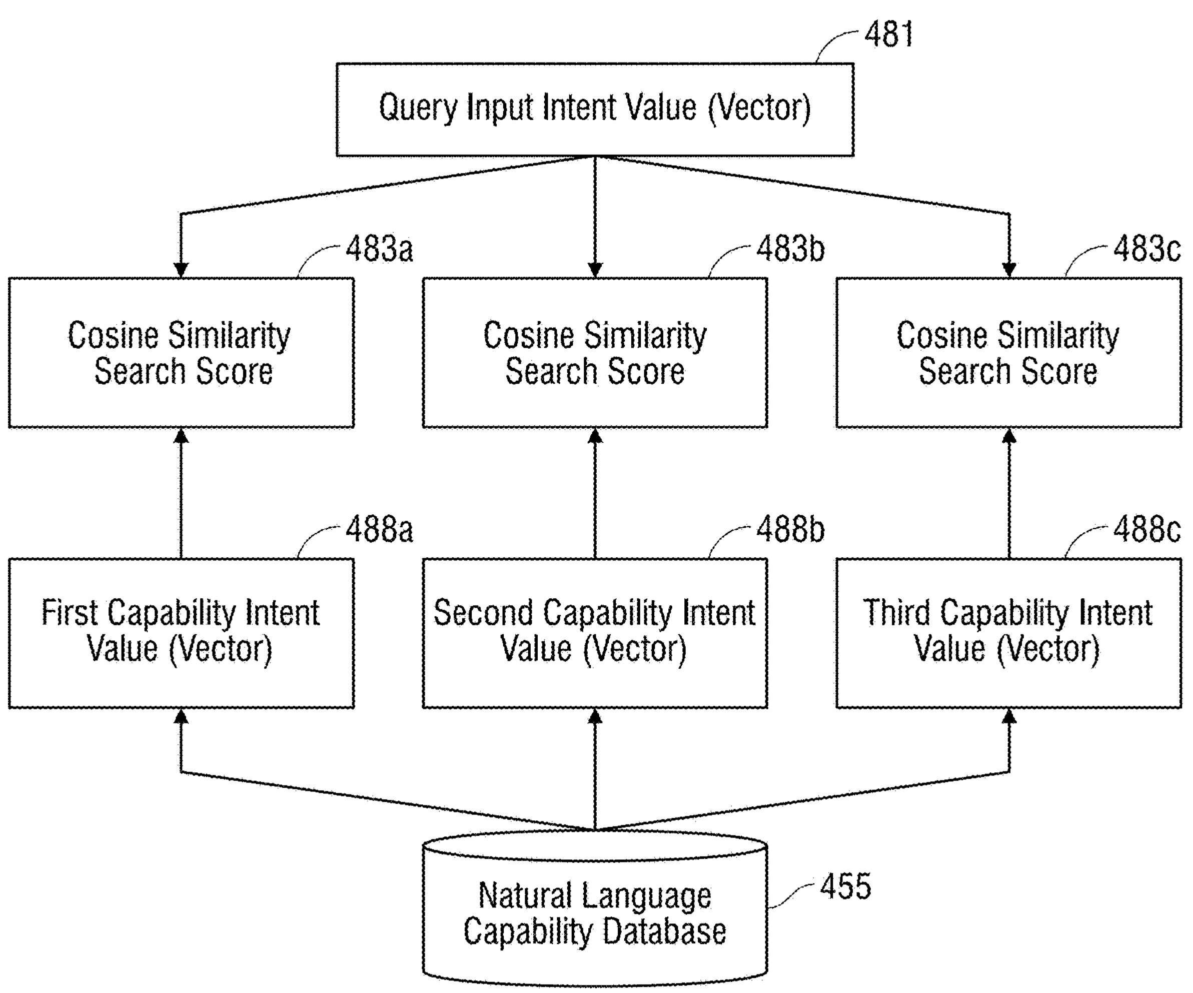
FIG. 4 is a block diagram illustrating a method of executing computer readable code instructions of modules of an OTB AI productivity tool to identify a capability having a capability intent value that generates a highest semantic cosine similarity search score in comparison to other capabilities within the same branch of a hierarchical capabilities decision tree according to an embodiment of the present disclosure.

FIG. 4 is a block diagram illustrating a method of identifying a capability of an artificial intelligence (AI) productivity tool enableable software application across a plurality of capabilities within a single level of a hierarchical capability decision tree with a semantic similarity search that best matches a received user query input by having a capability intent value that generates a highest cosine or other semantic similarity search score during execution of a semantic search machine learning model according to an embodiment of the present disclosure. As described herein, a hardware processor may execute machine readable code instructions for a semantic similarity search machine learning model that analyzes and weighs context and relevancy with values along various axes of a multi-axis vector intent value for a query or a capability. For example, in embodiments herein, a hardware processor may execute machine readable code instructions for a semantic similarity search machine learning model, via a query intent to capability ML algorithm module, that compares the vectorized user query input intent value 481 and the capability intent values 488*a*-488*c* stored within the natural language capability database 456. Such a comparison may be performed using a semantic search machine learning model, such as a cosine or other semantic similarity search algorithm that compares the distance or value difference in a multi-axis vector space between two vector intent values (e.g., 481 and each of 488*a*, 488*b*, and 488*c*) or a statistical correlation between the two vector intent values to determine the contextual similarity between the natural language description of the embedded text algorithm generated capability intent values 488*a* to 488*c* and the natural language user query input having a user query input intent value 481 generated from an embedded text algorithm. Such a contextual or semantic search methodology may take into account the fact that the same word may have two meanings or consider synonyms of words, for example based on generated intent values of multiple words or recognized phrases or parts of speech that yield the vector intent value from the text embedding algorithm machine learning models used to generate capability and query intent vector values. The semantic cosine similarity search comparison or other semantic similarity search algorithm may be performed for several of the capability intent values (such as 488*a*, 488*b*, and 488*c*) stored within the natural language capability database 455 to identify a plurality of cosine similarity search scores 483*a*, 483*b*, and 483*c* indicating a capability intent value (e.g., 488*a*) that most closely matches the user query input value 481 with a highest statistical correlation cosine similarity search score 483*b* (e.g., =0.745) that is closest to identity or highest correlation value between the query intent vector value and the capability intent vector value, according to embodiments herein. Semantic cosine similarity search scores of 0.5 and 0.1, for 483*a* and 483*c*, respectively do not have as high of a cosine similarity search score with the query input intent value 481 in the shown example embodiment.

As described herein, the natural language capabilities for a plurality of AI productivity tool enableable software applications are provided text descriptors that may be processed into capability intent values, such as 481 in a multi-axis vector space, such that these intent value mathematical representations of a user query input and a capability may be correlated by a semantic similarity search to select a capability responsive to a user query input. Any number of axes for the multi-axis vector spaces may be used in various embodiments. Indeed, many capability intent value generators or other machine learning algorithms for determining capability intent vector values for natural language terms or phrases and contemplated for use in embodiments herein utilize capability intent vector values that might be plotted among plural axes well above the three axis multi-axis vector spaces. For example, multi-axis vector spaces having 500 to 700 or more axes are contemplated for use with natural language algorithms with embodiments herein.

Each axis of the multi-axis vector space may provide a measurement of various attributes of a text excerpt that are known to provide context or semantic understanding of the text. For example, a reader's understanding of a given text excerpt may depend upon axis values that represent the reader's knowledge of any given word's meaning within the text, identified phrases within the text, or the understood order or sequence of words within the text. More specifically, one or more axis values in a multi-axis vector space for the vector intent values may represent that the reader's understanding is enhanced by the reader having a larger vocabulary and understanding of which words in that vocabulary are synonyms (closer in meaning) to a given word in that text, and which words are antonyms (further away in meaning) to that given word. As another example, one or more axis values may represent the reader's ability to identify common phrases, such as "in other words" and may provide greater insight to the semantic meaning of a text excerpt using this phrase than the reader's understanding of each of the words "in," "other," and "words" used separately from one another. As yet another example, one or more axis values may represent that the importance of the order of certain words in an excerpt may impact semantic meaning of the excerpt. More specifically, the phrase "man bites dog" may have a completely different semantic or contextual meaning than the phrase "dog bites man," although each phrase has the same words, just in a different order. Thus, the text embedding algorithm system's ability to incorporate values and identify common phrases of words grouped together and the importance of word order with the value of the generated vector intent value for a capability or query adds to the semantic meaning of a text excerpt using such a phrase to distinguish the semantic meaning in the generated vector intent value. Thus, the semantic similarity machine learning model algorithm may more accurately identify similarities of unique query intent values with capability intent values in embodiments herein.

Each axis of the multi-axis vector space, and thus, each value within a vector within such a multi-axis vector space may provide a measurement of these various attributes within a given intent value in embodiments herein. For example, a vector for a user query input intent value or for capability intent value may provide a measurement of similarity between any given word within the user query input or AI productivity tool enablable software application capabilities, respectively, a measurement of dissimilarity with known antonyms, identification of any given word as part of a phrase, or usage of any given word in a specific order that is known to be of importance. In such a way, the vectorized user query input intent value and capability intent values may mathematically represent a reader's contextual or semantic understanding of the user query input and the natural language descriptors for the capabilities of the AI productivity tool enableable software applications. These vector intent values may then be compared to one another with semantic similarity comparison such as a cosine similarity comparison algorithm in order to understand, not only which individual words are used, but also how alike various phrases within the user query input and capabilities are, and how alike the usage of those words and phrases are to provide a context, such as influenced by the order of those words or phrases and their relation to one another. The semantic similarity search comparison, such as a cosine similarity search model, may account for values as well as angular values or vector intent values within the vector intent space as part of the comparison.

Several text embedding algorithms may be used in various embodiments herein in order to provide such a mathematical representation of semantic understanding. For example, the text embedding module (265 of FIG. 2) may employ a Latent Semantic Analysis (LSA) or Latent Dirichlet allocation (LDA) which may define how close each of the observed terms in the received user query input are to various synonyms. As another example, the text embedding module (265 of FIG. 2) may employ a Word2Vec algorithm, which includes a neural network trained to understand which terms or phrases should be considered closer or further away from certain synonyms or antonyms. As yet another example, the text embedding module (265 of FIG. 2) may employ a fully recurrent neural network trained to consider the order of terms within the received user query input or the natural language descriptors of the capabilities for the AI productivity tool enableable software applications.

A hardware processor executing machine readable code instructions for a semantic search machine learning model of the similarity search module (e.g., 280 of FIG. 2) may determine a positive distance, that is a value difference of the vector intent values within the multi-axis vector space or the statistical correlation (e.g., up to 1.0 as an identity correlation) between the query input intent value 481 and each of a plurality of capability intent values 488*a*, 488*b*, or 488*c*. Then, for each of those determined distances or statistical correlation, the hardware processor executing machine readable code instructions for a semantic search machine learning model of the similarity search module (e.g., 280 of FIG. 2) may determine an angular difference with a threshold or an angular similarity having a value between zero and one for the query input intent value 481 and each of a plurality of capability intent values 488*a* to 488*c*. This angular similarity value in an embodiment may comprise the cosine similarity search score (e.g., 483*a*, 483*b*, or 483*c*) for a given capability intent value (e.g., 488*a*, 488*b*, and 488*c* respectively) in example embodiments, where zero is a worst match and one is a best match between the given capability intent value (e.g., 488*a*, 488*b*, and 488*c*) and the query input intent value 481. In such a way, a hardware processor executing code instructions for the query intent to capability module for the OTB AI productivity tool may take relevance and context of natural language within a user query input into account when determining a matching capability of an AI productivity tool enableable software application that is most likely to address the user's intent within the user query input. However, in some embodiments, the semantic similarity search described above in FIG. 4 may not account for important natural language keywords that may have an impact on determination of a capability of a capability node that should be selected as a responsive capability intent action to a received user query input. As such, additional embodiments herein discuss a TF-IDF weighted semantic similarity search to select a capability for a received user query input.

Figure 5:
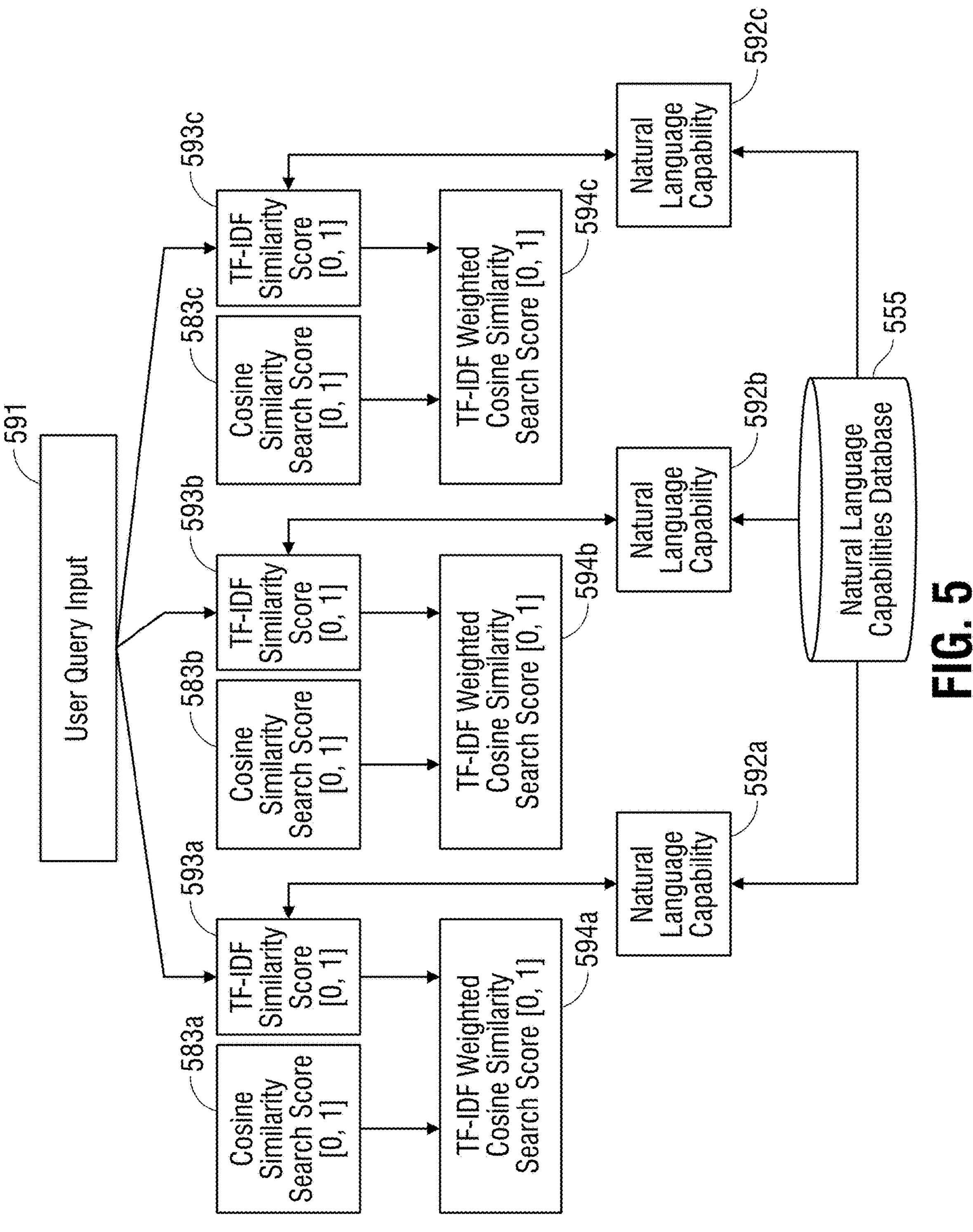
FIG. 5 is a block diagram illustrating a method of identifying a capability of an artificial intelligence (AI) productivity tool enableable software application that best matches a received user query input by weighting a semantic similarity search score by a text frequency-inverse document frequency similarity search score in branches of a hierarchical capabilities decision tree according to an embodiment of the present disclosure.

FIG. 5 is a block diagram illustrating a method of identifying a capability of an artificial intelligence (AI) productivity tool enableable software application that best matches a received user query input by weighting a semantic similarity search score by a text frequency-inverse document frequency (TF-IDF) similarity search score according to an embodiment of the present disclosure. As described herein, while semantic search methodologies, such as that described above with respect to FIG. 4 are better-suited than TF-IDF methodologies alone for use with natural language text excerpts for context accuracy, such as the user query input 591 and the natural language descriptions of capabilities 592*a* through 592*c*, TF-IDF methodologies are better-suited than semantic search methodologies where a single keyword within the user query input 591 is important to identifying a matching capability (e.g., 592*a*, 592*b*, or 592*c*) for an AI productivity tool-enableable software application to address the user's concerns. For example, a user may provide a natural language user query input 591 such as "reset password for locked account." In such a scenario the semantic search methodologies described above with respect to FIG. 4 may identify that an account issue has been encountered, but it may not focus heavily on the terms "password," or "locked," which may be important or determinative in finding the right capability (e.g., 592*a*, 592*b*, or 592*c*) for an AI productivity tool enableable software application to resolve the account issue. In such a case, it may be useful to also perform a TF-IDF comparison for the user query input 591 across the stored natural language descriptions of the capabilities (e.g., 592*a*, 592*b*, and 592*c*) within the natural language capabilities database 555 to identify the capability (e.g., 592*b*) that best addresses the specific terms "password" and "locked."

However, a user query input 591 for "change my email password" may yield a different result in embodiments herein. In such a scenario the semantic search methodologies described above with respect to FIG. 4 may identify that a password issue has been encountered, but it may not focus heavily on the terms "email," which may be important or determinative in finding the right capability (e.g., 592*a*, 592*b*, or 592*c*) for an AI productivity tool enableable software application to change an Outlook® email password as shown in FIG. 3. In such a case, it may be useful to also perform a TF-IDF comparison for the user query input 591 across the stored natural language descriptions of the capabilities (e.g., 592*a*, 592*b*, and 592*c*) within the natural language capabilities database 555 to identify the capability (e.g., 592*b*) that best addresses the specific terms "password" and "email."

As described herein, in order to increase the accuracy of the cosine or other semantic similarity search scores, such as 483*a* to 483*c* of FIG. 4 above in determining when a capability for an AI productivity tool enableable software application may address the user's request within a received user query input, the hardware processor executing machine readable code instructions for the query intent to capability determination module of the OTB AI productivity tool in an embodiment may, for each compared user query input 591 and natural language capability 592*a* to 592*c*, perform a TF-IDF comparison. For example, as shown in FIG. 5, and as part of the similarity search described above with reference to FIG. 4, the hardware processor executing machine readable code instructions for the similarity search module may determine the cosine or other semantic similarity search score 583*a* of 0.5 describing a degree of similarity between the query input intent value (481 of FIG. 4) for the user query input 591 and the capability intent value (482*a* of FIG. 4) for a natural language description of a capability 592*a* stored within the natural language capabilities database 555. As another example, the hardware processor executing machine readable code instructions for the similarity search module may determine the cosine or other semantic similarity search score 583*b* of 0.745 describing a degree of similarity between the query input intent value (481 of FIG. 4) for the user query input 591 and the capability intent value (482*b* of FIG. 4) for a natural language description of a capability 592*b* stored within the natural language capabilities database 555. In yet another example, the hardware processor executing machine readable code instructions for the similarity search module may determine the cosine or other semantic similarity search score 583*c* of 0.1 describing a degree of similarity between the query input intent value (481 of FIG. 4) for the user query input 591 and the capability intent value (482*c* of FIG. 4) for a natural language description of a capability 592*c* stored within the natural language capabilities database 555.

In an embodiment, each of these cosine similarity search scores 582*a* to 582*c* may then be weighted by a TF-IDF similarity score (e.g., 593*a* to 593*c*, respectively), in order to increase the accuracy of the cosine similarity or other semantic search scores 583*a* to 583*c* in determining when a capability (e.g., 592*a* to 592*c*) for an AI productivity tool enableable software application may address the user's request within the received user query input 591. For example, the hardware processor executing code instructions for the similarity search module (280 of FIG. 2) may perform a TF-IDF algorithm to measure the frequency with which each of a plurality of natural language terms appear within the user query input 591, as weighted by the frequency with which that term occurs in one of each of the natural language capabilities 592*a* to 592*c* stored within the natural language capabilities database 555. More specifically, the hardware processor executing code instructions for a TF-IDF algorithm may determine a TF-IDF similarity score 593*a* of 0.1 measuring the frequency with which each of a plurality of natural language terms, including "password," and "locked" from the first example above, appear in the user query input 591, as weighted by the frequency with which each of those terms also occur within the natural language capability 592*a*. As another example, the hardware processor executing code instructions for a TF-IDF algorithm may determine a TF-IDF similarity score 593*b* of 0.98 measuring the frequency with which each of a plurality of natural language terms, including "account," "password," and "locked" appear in the user query input 591, as weighted by the frequency with which each of those terms occur within the natural language capability 592*b*. In yet another example, the hardware processor executing code instructions for a TF-IDF algorithm may determine a TF-IDF similarity score 593*c* of 0.001 measuring the frequency with which each of a plurality of natural language terms, including "account," "password," and "locked" appear in the user query input 591, as weighted by the frequency with which each of those terms occur within the natural language capability 592*c*. Each TF-IDF similarity score determined in such a way may have a value between zero and one. Thus, if there is a TF-IDF match of terms such as "account," "password," and "locked" with those terms in a capability natural language description, the capability will have an increased weighting for a match over other capabilities that do not contain this term in embodiments herein. This may then avoid selection of a capability node such as "Outlook password" of 397*b* in FIG. 3 and focus instead toward "account password issues" of 395*d* and "Reset password for locked account" at 397*c* for the initial query as "reset password for locked account" at 591 in one example embodiment. It is contemplated that any number of known or later-developed TF-IDF comparison algorithms may be used, including the best-match 25 (BM25) algorithm, the Okapi BM25 algorithm, and the BM-25 with fields (BM-25F).

Each of the cosine or other semantic similarity search scores 583*a*, 583*b*, and 583*c* output of the semantic search comparison is weighted by one of the TF-IDF similarity search scores 593*a*, 593*b*, and 593*c*, respectively, for each natural language capability 592*a*, 592*b*, and 592*c*, respectively, that is compared to the user query input 591, via the hardware processor executing machine readable code instructions of the query intent to capability determination module. This may yield a TF-IDF weighted semantic similarity score 594*a*, 594*b*, and 594*c* for each natural language capability 592*a*, 592*b*, and 592*c* of a capability node being compared. For example, the cosine or other semantic similarity search scores 583*a* to 583*c* may be multiplied by the TF-IDF similarity search scores 593*a* to 593*c*, respectively in an embodiment. More specifically, the cosine or other semantic similarity search score 0.5 of 583*a* may be multiplied by the TF-IDF similarity search score 593*a* of 0.1 in an embodiment to yield a TF-IDF weighted cosine semantic similarity search score 594*a* of 0.05. In another example, the cosine or other semantic similarity search score 0.745 of 583*b* may be multiplied by the TF-IDF similarity search score 593*b* of 0.98 in an embodiment to yield a TF-IDF weighted cosine semantic similarity search score 594*b* of 0.74. In yet another example, the cosine or other semantic similarity search score 0.1 of 583*c* may be multiplied by the TF-IDF similarity search score 593*c* of 0.001 in an embodiment to yield a TF-IDF weighted cosine semantic similarity search score 594*c* of 0.0001.

In another example embodiment, a TF-IDF weighted cosine or other semantic similarity search score 594*a* may be determined by a hardware processor executing code instructions of the query intent to capability determination module as equivalent to one plus the cosine or other semantic similarity search score 583*a*, multiplied by one plus the TF-IDF similarity search score 593*a*. More specifically, the TF-IDF weighted cosine or other semantic similarity search score 594*a* of 1.155 may be determined by a hardware processor executing code instructions of the query intent to capability determination module as equivalent to one plus the cosine or other semantic similarity search score 583*a* of 0.5, multiplied by one plus the TF-IDF similarity search score 593*a* of 0.1. In another example, the TF-IDF weighted cosine or other semantic similarity search score 594*b* of 3.46 may be determined by a hardware processor executing code instructions of the query intent to capability determination module as equivalent to one plus the cosine or other semantic similarity search score 583*b* of 0.745, multiplied by one plus the TF-IDF similarity search score 593*b* of 0.98. In yet another example, the TF-IDF weighted cosine or other semantic similarity search score 594*c* of 1.10 may be determined by a hardware processor executing code instructions of the query intent to capability determination module as equivalent to one plus the cosine or other semantic similarity search score 583*c* of 0.1, multiplied by one plus the TF-IDF similarity search score 593*c* of 0.001.

The natural language capability (e.g., 592*c* that may include the keywords "account," "password," and "locked" in the first example above) for an AI productivity tool enableable software application having the highest TF-IDF weighted cosine or other semantic similarity search score may then be identified, via execution of machine readable code instructions of the query intent to capability determination module by the hardware processor, as the capability (e.g., 592*c*) most likely to address the user's intended request within the natural language user query input 591. In such a way, the hardware processor executing code instructions for the query intent to capability module for the OTB AI productivity tool may enhance semantic search performance by also considering important keywords when determining a matching capability of an AI productivity tool enableable software application that is most likely to address the user's intent within the user query input.

FIG. 6 is a block diagram illustrating a method of executing computer readable code instructions of modules of an OTB AI productivity tool to identify a capability that best matches a received user query input for each of a plurality of natural language descriptions of capabilities identified in a hierarchical capabilities decision tree according to embodiments herein. The parent/child relationships between capability nodes of a hierarchical capabilities decision tree shown in FIG. 6 may be identified in metadata of the capability nodes to define chains or branches of parent and child nodes in a hierarchical capabilities decision tree of capabilities in a natural language capabilities database with each capability node having capability intent values according to embodiments herein. By conducting a semantic similarity comparison search and term frequency-inverse document frequency (TF-IDF) comparison of the capability nodes in the hierarchical capabilities decision tree, those capability node branches that generate a highest term frequency-inverse document frequency (TF-IDF) weighted semantic similarity search score among the plurality parent capability nodes of branches link to the chain of child nodes within the capabilities decision tree that may further have highest TF-IDF weighted cosine similarity search scores overall to a received input query.

As in embodiments described herein, a hardware processor executing machine readable code instructions for the query intent to capability determination module of the OTB AI productivity tool may compare the vectorized user query input intent value 681 and each of several capability intent values, such as 683*a*, 683*b*, 683*c* within a first level of the hierarchical capabilities decision tree in embodiments herein setting up a determination of the branch or branches of the hierarchical capabilities decision tree from which to continue the TF-IDF weighted semantic cosine similarity search. The TF-IDF weighted semantic similarity search may include a TF-IDF weighted semantic cosine similarity search according to embodiments herein. The TF-IDF weighted semantic similarity search may proceed to child nodes 685*c* and 685*d* from parent 683*b* having a highest TF-IDF weighted cosine similarity search score (e.g., 0.81) among the first level capability nodes 683*a*, 683*b*, and 683*c* in embodiments herein. The TF-IDF weighted cosine similarity search may further proceed from the second level child nodes 685*c* and 685*d* depending upon a TF-IDF weighted similarity search score or a parent score and TF-IDF weighted similarity search score at the second level child nodes 685*c* and 685*d*. In one embodiment, a parent score and TF-IDF weighted similarity search score may be determined where the TF-IDF weighted similarity search score is further weighted by the parent capability node TF-IDF weighted cosine similarity score to yield a parent score and TF-IDF weighted cosine similarity search score for second level child nodes 685*c* and 685*d*.

Proceeding to a third level of the hierarchical capabilities decision tree, third level child capability nodes 687*c* and 687*d* in the branch beginning with capability node 683*b* using a further TF-IDF weighted semantic similarity search, such as the TF-IDF weighted cosine similarity search comparison for these capability nodes 687*c* and 687*d* on the third level in embodiments herein. The capability nodes 687*c* and 687*d* may have an independent TF-IDF weighted cosine similarity search score determined for these capability nodes 687*c* and 687*d* with the query intent value.

In other embodiments, a parent score and TF-IDF weighted comparison may be made as described. This independent TF-IDF weighted cosine similarity search score determined for these capability nodes 687*c* and 687*d* may be further weighted in some embodiments by the TF-IDF weighted cosine similarity search score of the immediate second level parent capability node 685*d* and any previous parent capability nodes 683*b* to yield a parent and TF-IDF weighted cosign similarity search score for each of the third level capability nodes 687*c* and 687*d* in embodiments herein.

In embodiments herein, the TF-IDF weighted cosine similarity search score of the third level child capability nodes 687*c* and 687*d* may be used to determine a highest correlation to a user query input intent 681. Thus, the hardware processor executing machine readable code instructions for the query intent to capability determination module may compare a single user query input to a plurality of natural language capabilities for AI productivity tool enableable software applications efficiently and in a manner that is keyword sensitive when there are several capabilities available without having to directly compare to all available capabilities in a natural language capability database.

This process may be performed for all of the capability intent values down a particular branch of the hierarchical capabilities decision tree (e.g., including but not limited to 683*b*, 685*d* and 687*c* and 687*d*) determined for each of the capability natural language descriptions and stored in the hierarchical capabilities decision tree at the capabilities intent values database. This avoids an overbroad semantic and lexical keyword similarity comparisons against all capability natural language descriptions for all capabilities that may be superfluous and result in data saturation where more processing resources are consumed than are necessary to reach an accurate conclusion of a matching capability intent value with keyword sensitivity for a responsive capability that best matches the user query input. In order to overcome the risk of such data saturation when there are several capability nodes (e.g., 30 to 100 capability nodes or more) in an embodiment, the hardware processor executing machine readable code instructions for the query intent to capability determination module of the OTB AI productivity tool may limit the number of comparisons made against the query input intent value 681 via traversing the hierarchical capabilities decision tree as described in embodiments herein. This semantic similarity comparison search along branches of the hierarchical capabilities decision tree is based on parent/child relationships of capabilities identified within metadata and illustrated by the positions of the natural language descriptions of the capabilities, or phrases therewithin, as given in the hierarchical capabilities decision tree in FIG. 6 and which is further described above with respect to FIG. 3.

For example, the hardware processor executing machine readable code instructions for the query intent to capability determination module of the OTB AI productivity tool may determine, for each node describing a capability in natural language at a first level of the hierarchical capabilities decision tree, a TF-IDF weighted cosine semantic similarity search score is generated from comparison of the vectorized user query input intent value and the capability intent values for the natural language descriptions as well as the lexical keywords comparison of the natural language of the capability description at each of the capability nodes at the first level. This TF-ID weighted cosine semantic similarity search is conducted using a semantic cosine comparison algorithm and weighting the output of that algorithm by a TF-IDF comparison between the natural language of the user query input and the natural language descriptions of those capability nodes in embodiments herein. Although a semantic cosine similarity comparison algorithm is described in several embodiments, it is appreciated that any semantic similarity comparison algorithm may be conducted to semantically compare a query intent value and capability intent values of capability nodes in various embodiments herein.

In a specific example embodiment, the hardware processor executing machine readable code instructions for the query intent to capability determination module may determine, for each of capability node 683*a*, 683*b*, and 683*c* describing a capability in natural language at a first level (e.g., 392 of FIG. 3) of the hierarchical capabilities decision tree, a cosine semantic similarity search score for capability nodes shown at first level parent capability nodes 683*a*, 683*b*, and 683*c*, respectively. These cosine similarity search scores for capability nodes shown at first level parent capability nodes 683*a*, 683*b*, and 683*c* compare the vectorized user query input intent value 681 and the capability intent values for the natural language descriptions, such as "operating system," "accounts," and "display," of the first level parent capability nodes 683*a*, 683*b*, and 683*c* at the first level of the hierarchical capabilities decision tree. These cosine semantic similarity search scores shown at first level parent capability nodes 683*a*, 683*b*, and 683*c* may then be weighted by a TF-IDF comparison of the natural language of the user query input 681 "reset password for locked account" against the natural language descriptions "operating system," "accounts," and "display," of the first level parent capability nodes 683*a*, 683*b*, and 683*c* at the first level of the hierarchical capabilities decision tree.

The hardware processor executing machine readable code instructions of the query intent to capability determination module may then determine a best match capability among a first level of parent capability nodes 683*a*, 683*b*, and 683*c* having a highest TF-IDF weighted cosine semantic similarity search score to a user query input and query input intent value 681 for "reset password for locked account" among the natural language capabilities at the first level of the hierarchical capabilities decision tree. For example, hardware processor executing machine readable code instructions of the query intent to capability determination module may determine from the first level parent capability nodes 683*a*, 683*b*, and 683*c* the best match capability node 683*b* for the natural language description "accounts," having a highest TF-IDF weighted cosine semantic similarity search score of 0.73 among the other cosine semantic similarity search scores of 0.31 for parent capability node 683*a* and 0.0001 for parent capability node 683*c* for the other natural language capabilities of "operating system," and "display," respectively, at the first level of the hierarchical capabilities decision tree of FIG. 6.

Instead of performing this determination for each node of the second level of the hierarchical capabilities decision tree, the hardware processor executing machine readable code instructions for the query intent to capability determination module may determine a TF-IDF weighted cosine semantic similarity search score only for the children of the capability natural language description identified as the parent best match first level parent capability node 683*b* for the previous level of the hierarchical capabilities decision tree. Comparison of TF-IDF weighted cosine semantic similarity search scores, as performed via execution of machine readable code instructions of the query intent to capability determination module by the hardware processor in embodiments herein, may be limited at each level of the hierarchical capabilities decision tree to children of the natural language description of the capability at the previous level having a capability intent value generating a highest parent TF-IDF weighted cosine semantic similarity search score in embodiments herein. This may save processing resources and time from executing TF-IDF weighted cosine semantic similarity search score determination for all capability nodes in the hierarchical capabilities decision tree.

For example, in an example embodiment, the parent best match first level parent capability node 683*b* for the natural language description "accounts" has a highest TF-IDF weighted cosine semantic similarity search score of 0.73 at the first level of the hierarchical capabilities decision tree of FIG. 6 to the query input and query input intent value 681 for "reset password for locked account." In such an embodiment, the hardware processor executing machine readable code instructions for the query intent to capability determination module may determine, for each second level child node 685*c* and 685*d* for the first level parent node 683*b*, TF-IDF weighted cosine semantic similarity search scores of 0.271 and 0.81 at 685*c* and 685*d*, respectively. Again, the intent to capability determination module may compare the vectorized user query input intent value 681 and the capability intent values for the natural language descriptions "add an account," and "account password issues" of the capability nodes 685*c* and 685*d* at the second level of the hierarchical capabilities decision tree with a semantic cosine similarity search algorithm that is weighted by a keyword similarity comparison, such as BM25, for keywords in the natural language descriptions of capability nodes 685*c* and 685*d* in embodiments herein. Other second level child capability nodes (not shown in FIG. 6) that are children of first level parent capability nodes 683*a* and 683*c* are not assessed for TF-IDF weighted cosine semantic similarity search scores in embodiments herein.

Thus, the TF-IDF weighted cosine semantic similarity search score of 0.81 for the natural language description of "account password issues" of the capability node 685*d* is the highest TF-IDF weighted cosine semantic similarity search score considered at the second level and is higher than capability nodes at other levels in the branch of the hierarchical capabilities decision tree. For example, the TF-IDF weighted cosine semantic similarity search score for capability node 685*c* is higher than the TF-IDF weighted cosine semantic similarity search score for the first level parent capability node 683*b*. In such a scenario, the hardware processor executing machine readable code instructions for the query intent to capability determination module may focus determination of TF-IDF weighted cosine semantic similarity search scores for the next, second level (e.g., 396 of FIG. 3) below capability node 685*d* within the hierarchical capabilities decision tree to only the third level child capability nodes 687*c* and 687*d* of the second level (now parent) capability node 685*d* having the highest TF-IDF weighted cosine semantic similarity search score of 0.81.

For example, the hardware processor executing machine readable code instructions for the query intent to capability determination module may determine, for each third level child capability node 687*c* and 687*d* branched from the second level parent best match capability node 685*d* of the hierarchical capabilities decision tree, TF-IDF weighted cosine semantic similarity search scores of 1.05 and 0.32 at 687*c* and 687*d*, respectively. These cosine semantic similarity search scores of 1.05 and 0.32 at 687*c* and 687*d*, respectively compare the vectorized user query input intent value 681 and the capability intent values as well as TF-IDF comparison for the natural language descriptions "reset password for locked account," and "account recovery" of the third level child capability nodes 687*c* and 687*d* to the user query input 681 in the example embodiment.

This process of determining the highest TF-IDF weighted cosine semantic similarity search score among natural language descriptions of capabilities for child nodes of a parent node having a highest TF-IDF weighted cosine semantic similarity search score at a previous level of the hierarchical capabilities decision tree may be repeated for each level (e.g., 392, 394, and 396 of FIG. 3) of the hierarchical capabilities decision tree, until it is determined that the next level node of a branch having most recently identified highest TF-IDF weighted cosine semantic similarity search score for its level within the hierarchical capabilities decision tree does not have a child capability node in some embodiments. In other embodiments, the above process may proceed until it is determined that the next level node of a branch having most recently identified highest TF-IDF weighted cosine semantic similarity search score for its level within the hierarchical capabilities decision tree has only child capability nodes at the next lower level of the hierarchical capabilities decision tree with lower TF-IDF weighted cosine semantic similarity search scores in other embodiments. At that point, the hardware processor executing code instructions for the query intent to capability determination module may identify the capability identified for the capability intent node among the levels along the selected branch of the hierarchical capabilities decision tree having the identified highest TF-IDF weighted cosine semantic similarity search score, such as capability node 687*c*, as the best match capability responsive to the user query input and query input intent 681.

In such a way, the hardware processor executing machine readable code instructions of the query intent to capability determination module may consistently narrow focus of comparisons between the query input intent value and the plurality of capability intent values to natural language descriptions of increasing specificity, while still taking into account the importance of various keywords within the user query input natural language. The natural language capability for an AI productivity tool enableable software application having the highest TF-IDF weighted cosine semantic similarity search score may then be identified, via execution of machine readable code instructions of the query intent to capability determination module by the hardware processor, as the capability node in the hierarchical capabilities decision tree for a capability most likely to address the user's intended request within the natural language user query input. For example, the natural language capability description of third level capability node 687*d* for "reset password for locked account" for an AI productivity tool enableable software application having the highest TF-IDF weighted cosine semantic similarity search score of 1.05 may then be identified, via execution of machine readable code instructions of the query intent to capability determination module by the hardware processor, as the capability most likely to address the user's intended request within the natural language user query input. Use of the highest TF-IDF weighted cosine semantic similarity search score in the assessed branch of the hierarchical capabilities decision tree may be useful in comparison amongst TF-IDF weighted cosine semantic similarity scores between capability nodes at different levels of the hierarchical capabilities decision tree in embodiments herein.

In some other embodiments, the TF-IDF weighted cosine semantic similarity search score for each child node may be further weighted by a parent TF-IDF weighted cosine semantic similarity search score for its parent. For example, the TF-IDF weighted cosine semantic similarity search scores of 0.27 for the second level capability node 585*c* "add new account" and 0.81 for second level capability node 685*d* for "account password issues" may be weighted by the TF-IDF weighted cosine semantic similarity search score of 0.73, determined for their parent capability node 683*b* for "accounts." This may provide a parent score and TF-IDF weighted cosine semantic similarity search score of 0.1971 for the natural language description "add new account" at second level capability node 685*c* and a parent score and TF-IDF weighted cosine semantic similarity search score of 0.5913 for the natural language description "account password issues" at second level capability node 685*d*. This provides for a more distinct comparison of TF-IDF weighted cosine semantic similarity search scores, especially when comparing second level child capability nodes 685*c* and 685*d* with first level parent capability node 683*b* in some example embodiments.

In another example, the TF-IDF weighted cosine semantic similarity search scores of 1.05 for the third level capability node 587 *c*"reset password for locked account" and 0.32 for second level capability node 687*d* for "account recovery" may be weighted by the TF-IDF weighted cosine semantic similarity search score of 0.81, determined for their parent capability node 685*b* for "account password issues." This may provide a parent score and TF-IDF weighted cosine semantic similarity search score of 0.8505 for the natural language description "reset password for locked account" at third level capability node 687*c* and a parent score and TF-IDF weighted cosine semantic similarity search score of 0.26 for the natural language description "account recovery" at third level capability node 687*d*. Again, this may be useful in determining a highest TF-IDF weighted cosine semantic similarity score for a capability node in the hierarchical capabilities decision tree while keeping relevant data of the parent capability node or nodes in embodiments herein. This may be useful in comparison amongst TF-IDF weighted cosine semantic similarity scores between capability nodes at different levels of the hierarchical capabilities decision tree in some embodiments.

In some embodiments herein therefore, the hardware processor executing machine readable code instructions of the query intent to capability determination module may focus upon capabilities having natural language keywords most often used within the query input and consistently narrow focus of comparisons between the query input intent value and the plurality of capability intent values to natural language descriptions of increasing specificity and compare among different levels of the hierarchical capabilities decision tree with parent context included. The natural language capability for an AI productivity tool enableable software application having the highest TF-IDF weighted cosine semantic similarity search score or highest parent-score and TF-IDF weighted cosine semantic similarity search score may then be identified, via execution of machine readable code instructions of the query intent to capability determination module by the hardware processor as the capability within the hierarchical capabilities decision tree most likely to address the user's intended request within the natural language user query input. For example, the natural language capability description of "reset password for locked account" of third level capability node 687*c* for an AI productivity tool enableable software application having the highest parent-score and TF-IDF weighted cosine semantic similarity search score of 0.8505 or a highest TF-IDF weighted cosine semantic similarity search score of 1.05 and may then be identified, via execution of machine readable code instructions of the query intent to capability determination module by the hardware processor, as the capability most likely to address the user's intended request within the natural language user query input. In such a way, the hardware processor executing code instructions for the query intent to capability module for the OTB AI productivity tool may overcome or lessen the impacts of data saturation encountered by comparing the query input intent value to all capability intent values that may be included in the hierarchical capabilities decision tree, and may thus decrease consumption of processing resources or may increase efficiency of determining a responsive capability.

Figure 7:
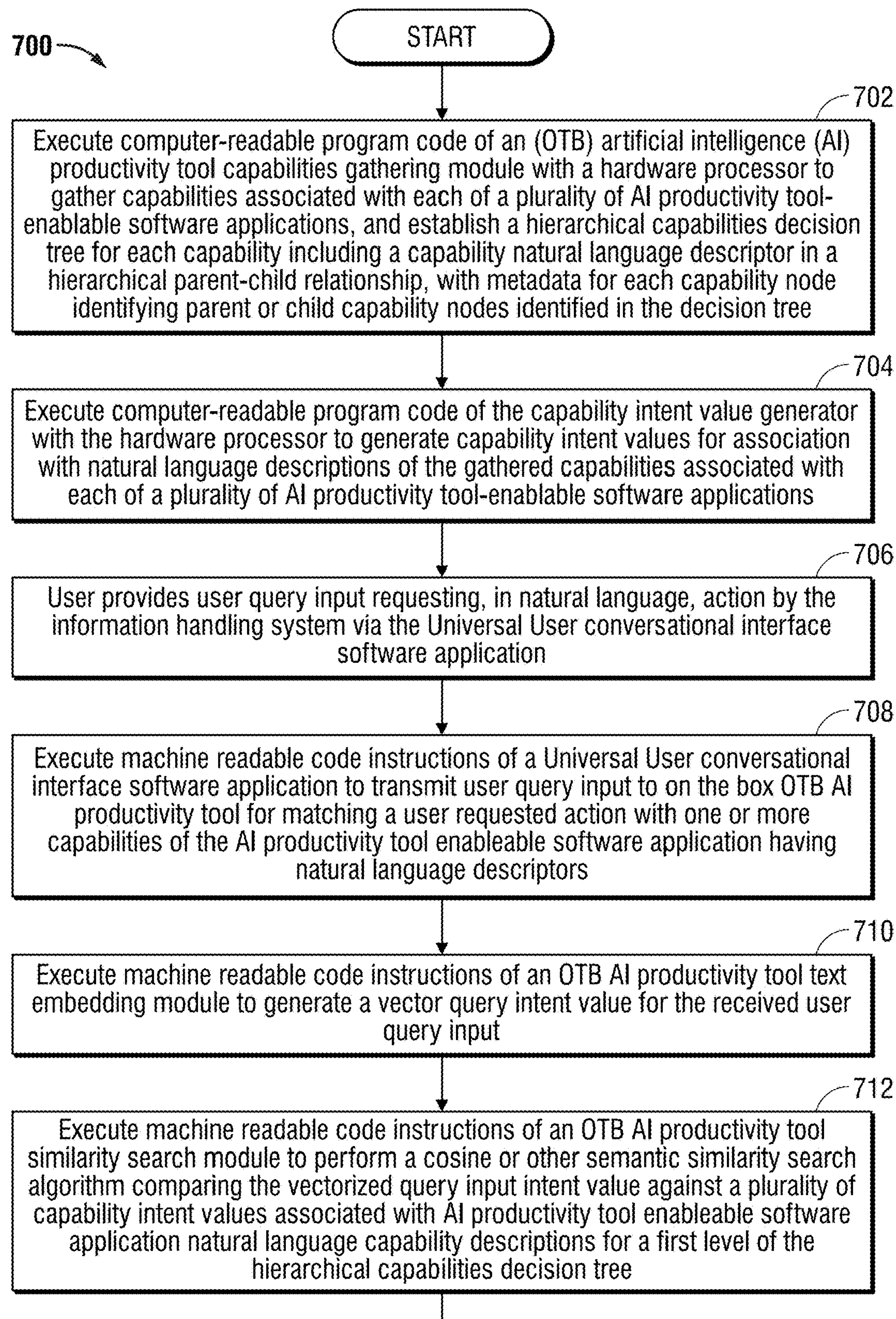
FIG. 7 is a flowchart showing a method of executing computer readable code instructions of modules of an OTB AI productivity tool to identify a capability that best matches a received user query input through keyword sensitive semantic similarity search algorithms, such as a TF-IDF weighted cosine semantic similarity search score algorithm, for each parent within a capabilities decision tree according to an embodiment of the present disclosure.
Figure 7:
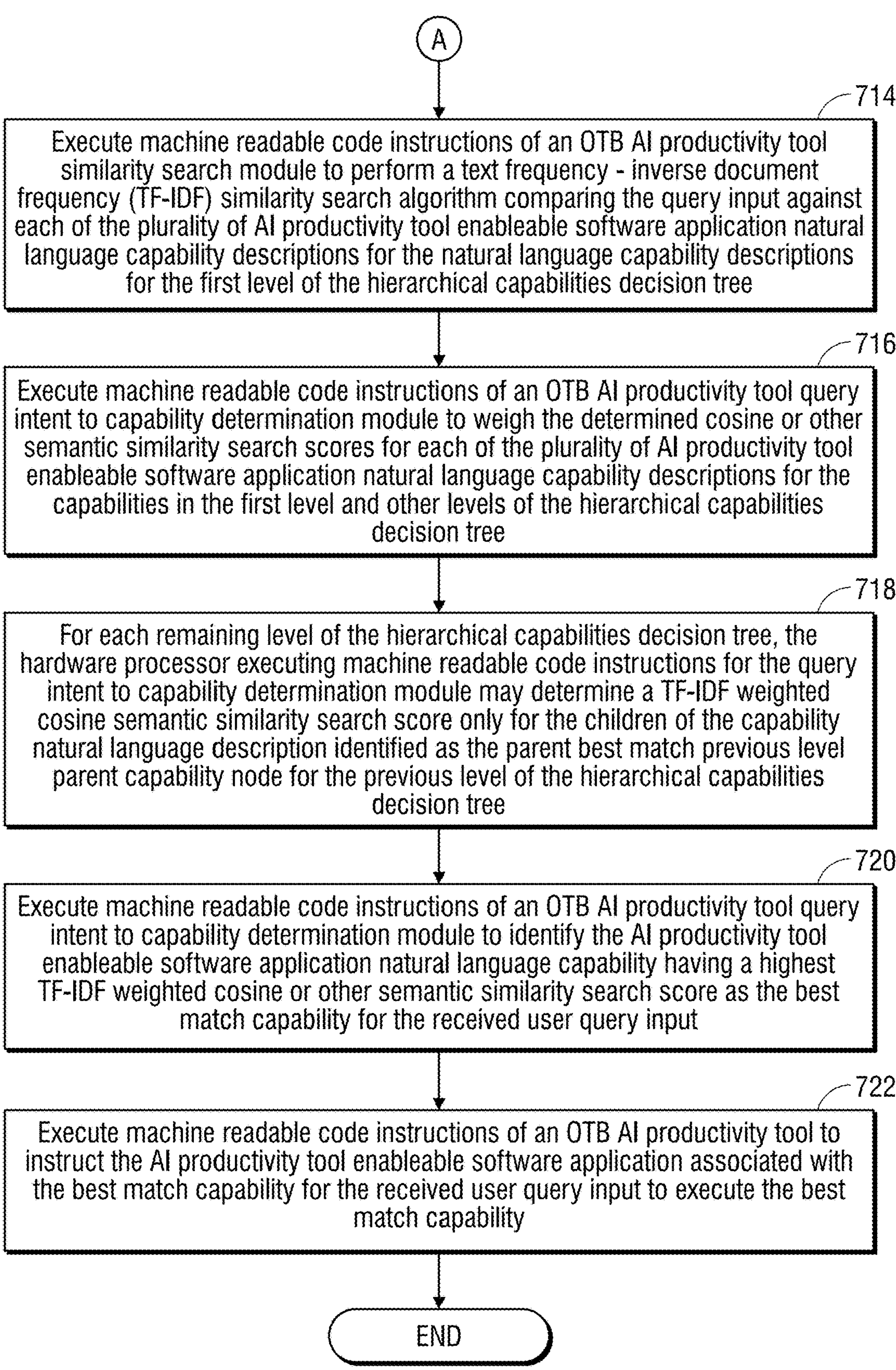

FIG. 7 is a flowchart 700 showing a method of identifying a capability of an artificial intelligence (AI) productivity tool enableable software application that best matches a received user query input through a text frequency-inverse document frequency (TF-IDF) weighted semantic search that considers a cosine semantic similarity search score and a TF-IDF score for a subset of capabilities within a capabilities decision tree according to an embodiment of the present disclosure. It is appreciated that the method 700 described herein may be executed via execution of computer readable program code instructions in firmware or software by a hardware processor or other hardware processing device on an information handling system.

The method 700 may include, at block 702, executing computer-readable program code instructions of a capabilities gathering module via a hardware processor, hardware controller or other hardware processing resource to gather capabilities associated with each of a plurality of AI productivity tool-enablable software applications. These capabilities gathered by The capabilities gathering module may include any input and output capabilities provided by the AI productivity tool-enablable software applications being executed or to be executed by the hardware processor or any other hardware processing devices of an information handling system. For example, an AI productivity tool-enablable software application may include a word processing application such as Microsoft® Word® that may receive input (e.g., via voice at a microphone or text via a keyboard) and provide output via text. Still further, other examples of an AI productivity tool-enablable software application may include a software updating system, virus protection software, and setting optimization software such as Dell® SupportAssist® module that are code instructions executable by the hardware processor or other hardware processing resource of the information handling system. With SupportAssist®, a user may provide input via, for example, the microphone requesting information related to a setting associated with the information handling system. Thus, capabilities of SupportAssist® may include virus protection capabilities, setting manipulation capabilities, and software updating capabilities that may each be detected and gathered via the execution of the capabilities gathering module for use and categorization of these capabilities as described herein.

Even further, examples of an AI productivity tool-enablable software application may include Dell® Display®/Peripheral Manager®. The Dell® Display®/Peripheral Manager® may be computer-readable program code instructions that have capabilities that include optimization of screen resolution, refresh rates, and gamma correction as well as webcam settings, mouse settings, keyboard settings, stylus settings, microphone settings, and trackpad settings, among other settings and connections associated with the wired or wireless input/output devices. Again, these capabilities associated with the execution of the Dell® Display®/Peripheral Manager® subagent may be gathered by the capabilities gathering module for later determination of capability vector intent values and categorization as described herein. It is appreciated that any AI productivity tool-enablable software application of computer-readable program code instructions in software, firmware, or some combination that may publish or provide a listing of capabilities to be gathered by the capabilities gathering module. For example, each AI productivity tool-enablable software application publish or have assigned to it one or more descriptor terms or phrases for capabilities of the AI productivity tool-enablable software application for use with an OTB AI productivity tool, such as for with a chatbot natural language system. Further examples of AI productivity tool-enablable applications may include, for example, Dell® Trusted Device® application, a remediation Dell® APEX Managed Device Service (AMDS)® AI productivity tool-enablable software application, Alienware Command Center (AWCC)® AI productivity tool-enablable software application, among others. The capabilities of each of these AI productivity tool-enablable software applications, including descriptors associated with those capabilities, may be gathered via execution, by the hardware processor or any other hardware processing device, of the capabilities gathering module.

As described in an embodiment with respect to FIG. 3, the natural language descriptions of capabilities for the AI productivity tool enableable software applications in an embodiment may be organized into a hierarchical capabilities decision tree 390 that maps logical parent-child relationships established by an ITDM between and among the plurality of natural language descriptions of capabilities at capability nodes in this hierarchical capabilities decision tree 390 in an embodiment. The hierarchical capabilities decision tree 390 may include the plurality of gathered capabilities and stored in a natural language capability database on the information handling system. Each capability node of this hierarchical capabilities decision tree 390 in an embodiment may have the same data fields, including a capability name, capability identification (ID) (e.g., in alphanumeric values), and a natural language description or phrase therewithin of the capability, capability intent value, and metadata or other data for the capability including designation of parent or child relationships. For example, a query input with a query intent value at 391 may be subject for a cosine semantic similarity search comparison algorithm with TF-IDF comparison with one or more branches of the hierarchical capabilities decision tree 390 having parent and child capability nodes 393*a*, 393*b*, 393*c* at a first level 392, capability nodes 395*a*, 395*b*, 395*c*, 395*d* at a second level 394, and capability nodes 397*a*, 397*b*, 397*c*, and 397*d* at a third level 396 of the hierarchical capabilities decision tree 390 in an embodiment. Each capability node in the hierarchical capabilities decision tree 390 may include a capability name, a capability ID, an associated capability vector intent value, and other metadata or data relating to the capability such as parent/child designations or associated AI productivity tool enableable software application of the capability. Each of the capability nodes 393*a*, 393*b*, 393*c*, 393*d*, 395*a*, 395*b*, 395*c*, 395*d*, 397*a*, 397*b*, 397*c*, and 397*d* in the hierarchical capabilities decision tree 390 may include a natural language description phrases of as shown for "Operating System," "accounts," "display," "password," "update," "add an account," "account password issues," "windows password," "Outlook password," "reset password for locked account," and "account recovery," respectively.

The hierarchical capabilities decision tree 390 in an embodiment may identify child capability nodes having capability natural language descriptions or phrases therewithin as providing greater specificity than its identified parent capability natural language description or phrases within the hierarchical capabilities decision tree 390. For example, a first level parent capability node 393*b* for a capability natural language description phrase such as "accounts" may have second level child capability nodes 395*c* and 395*d* for capability natural language description phrases, including "add an account," and "account password issues," respectively. At a second level 394 of the hierarchical capabilities decision tree 390 a now-parent second level capability node 395*d* for a capability natural language description phrase such as "account password issues" may further have two third level child nodes 397*c* and 397*d* for capability natural language description phrases, including "reset password for locked account," and "account recovery," respectively, with each child node, such as second level child capability nodes 395*d* and 395*c*, and third level child capability nodes 397*c* and 397*d* providing a more specific capabilities related to the first level parent capability node 393*b* a phrase "accounts."

In embodiments herein, semantic similarity search comparison of a query input such as 391 may begin across three first level parent capability nodes 393*a*, 393*b*, and 393*b* for capability natural language description phrases, including "Operating System," and "accounts," and "display," respectively, that form root or primary capability nodes for branches of the hierarchical capabilities decision tree 390.

Parent nodes for capability natural language descriptions or phrases may be separated from child nodes for capability natural language descriptions or phrases within the hierarchical capabilities decision tree 390 in an embodiment by such branches, such as those shown beginning with first level capability parent nodes 393*a*, 393*b*, and 393*b*. Each level of the hierarchical capabilities decision tree 390 may thus include one or more nodes identified as a child, and connected via a branch to one of the nodes in the previous level of the hierarchical capabilities decision tree. Each capability natural language description or phrase identified as a child in such a way within the hierarchical capabilities decision tree 390 may include an identification of its parent node or parent capability natural language description/phrase.

At block 704, the method 700 includes an information handling system hardware processor, hardware controller, or other hardware processing resource executing computer-readable program code of the capability intent value generator to generate capability intent values with execution of a text embedding machine learning model for association with the natural language descriptions or descriptors for those gathered capabilities associated with each of a plurality of AI productivity tool-enablable software applications. Execution of computer-readable program code of the capability intent value generator may cause the specific words, sets of words, phrases, or order of word usage associated with the natural language descriptors of capabilities of each of the AI productivity tool-enablable software applications described herein to be used to generate vectorized capability intent values for those capabilities. For example, a capability intent value for association with the natural language description of the various capabilities associated with the Dell® SupportAssist® may include descriptors such as "virus protection," "updating," "update," "settings," "settings optimization," "account," "password," "operating system," and the like that describe these capabilities. Similar or other descriptors may be associated with a plurality of other capabilities for additional AI productivity tool-enablable software applications in embodiments herein. Each of these capability intent vector values for association with the natural language descriptions of these capabilities and their capability intent vector values may also be associated with a capability ID such as an alphanumeric ID that may identify, uniquely, these capabilities for storage in a database for example or for publication, storage, and use with embodiments herein.

As a specific example, the hardware processor executing machine readable code instructions for a capability intent value generator of the OTB AI productivity tool may determine capability intent values associated with natural language descriptions of the gathered capabilities for each of a plurality of AI productivity tool-enablable software applications. These capability intent values for each capability may be stored with each capability node within the hierarchical capabilities decision tree at the natural language capability database in embodiments herein.

The capability intent values are a mathematical representation of the natural language descriptions of capability operations or services from various AI productivity tool-enablable software applications in an embodiment. These capability intent values may be represented by a mathematical value in a multi-axis vector space that may be associated with the natural language description for that capability or intent. In an embodiment, the capabilities may also be associated with an identification (ID) such as an alphanumeric ID that may be stored within a natural language capability database. These capabilities stored at the natural language capability database may include any input and output capabilities provided by the AI productivity tool-enablable software applications being executed by the hardware processor or any other hardware processing devices.

At block 706, a user in an embodiment may provide a user query input requesting, in natural language, an action or response by the information handling system via the universal user conversational interface software application or other interface (e.g., specific for an AI productivity tool enableable software application). For example, a user may provide text or voice data (e.g., via IO device 116, or microphone 118 of FIG. 1) to a universal user conversational interface, operating as a chatbot to simulate a conversation between the user and any of several AI productivity tool enableable software applications.

The hardware processor in an embodiment at block 708 may execute machine readable code instructions of a universal user conversational interface software application or other interface to transmit the user query input to the OTB AI productivity tool for matching a user requested action in a user query input with natural language capabilities of the AI productivity tool enableable software application. For example, in an embodiment described at FIG. 2, once the capabilities have been gathered (e.g., at block 702) at natural language capabilities database 255, the hardware processor 202 executing machine readable code instructions of the OTB AI productivity tool 250 in an embodiment may receive a user query input, via the universal user conversational interface software application 270 or other interface requesting that an action be taken at the information handling system. The OTB AI productivity tool 250 may later use machine-learning methodologies to determine a capability stored at the natural language capability database 255 for an AI productivity tool enableable software application 211, that can address the request in the user query input, as described further below.

At block 710, the hardware processor in an embodiment may execute machine readable code instructions of an OTB AI productivity tool text embedding module to generate a vector query intent value for the received user query input. For example, in an embodiment in which the user provides a user query input in the form of voice data to the AI productivity tool enableable software application 211 via the OTB AI productivity tool 250 and the universal software application conversation interface 270, the hardware processor 202 executing machine-readable code instructions of an automated speech recognition (ASR) module 263 to detect words within the recorded voice data. The hardware processor 202 may also execute machine readable code instructions of a text embedding module 265 to detect which of these words are nouns, verbs, or commonly used sentence structures and generate a vectorized query input intent value for the user query input.

As also described in an example embodiment with respect to FIG. 4, the natural language capabilities for a plurality of AI productivity tool enableable software applications are provided text descriptors that may be processed into capability intent values, such as 481, in a multi-axis vector space, such that these intent value mathematical representations of a user query input and a capability may be correlated by a semantic similarity search to select a capability responsive to a user query input. Any number of axes for the multi-axis vector spaces may be used in various embodiments. Indeed, many capability intent value generators or other machine learning algorithms for determining capability intent vector values for natural language terms or phrases and contemplated for use in embodiments herein utilize capability intent vector values that might be plotted among plural axes well above the three axis multi-axis vector spaces. For example, multi-axis vector spaces having 500 to 700 or more axes are contemplated for use with natural language algorithms with embodiments herein.

Each axis of the multi-axis vector space may provide a measurement of various attributes of a text excerpt that are known to provide context or semantic understanding of the text. For example, one or more axes may represent a reader's understanding of a given text excerpt may depend upon the reader's knowledge of any given word's meaning within the text, identified phrases within the text, or the understood order or sequence of words within the text. More specifically, one or more axes may represent that the reader's understanding is enhanced by the reader having a larger vocabulary and understanding of which words in that vocabulary are synonyms (closer in meaning) to a given word in that text, and which words are antonyms (further away in meaning) to that given word. Thus, the text embedding algorithm system's ability to incorporate values and identify common phrases of words grouped together and the importance of word order with the value of the generated vector intent value for a capability or query adds to the semantic meaning of a text excerpt using such a phrase to distinguish the semantic meaning in the generated vector intent value. Thus, the semantic similarity machine learning model algorithm may more accurately identify similarities of unique query intent values with capability intent values in embodiments herein.

Each axis of the multi-axis vector space, and thus, each value within a vector within such a multi-axis vector space may provide a measurement of these various attributes within a given intent value in embodiments herein. For example, a vector for a user query input intent value or for capability intent value may provide a measurement of similarity between any given word within the user query input or AI productivity tool enablable software application capabilities, respectively, a measurement of dissimilarity with known antonyms, identification of any given word as part of a phrase, or usage of any given word in a specific order that is known to be of importance. In such a way, the vectorized user query input intent value and capability intent values may mathematically represent a reader's contextual or semantic understanding of the user query input and the natural language descriptors for the capabilities of the AI productivity tool enableable software applications. These vectors may then be compared to one another in order to understand, not only which individual words are used and their frequencies, as determined through TF-IDF comparison for example, but also how alike various phrases within the user query input and capabilities are, and how alike the usage of those words and phrases are to provide a context, such as influenced by the order of those words or phrases and their relation to one another.

Several text embedding algorithms may be used in various embodiments herein in order to provide such a mathematical representation of semantic understanding. For example, the text embedding module (265 of FIG. 2) may employ a Latent Semantic Analysis (LSA) or Latent Dirichlet allocation (LDA) which may define how close each of the observed terms in the received user query input are to various synonyms. As another example, the text embedding module (265 of FIG. 2) may employ a Word2Vec algorithm, which includes a neural network trained to understand which terms or phrases should be considered closer or further away from certain synonyms or antonyms. As yet another example, the text embedding module (265 of FIG. 2) may employ a fully recurrent neural network trained to consider the order of terms within the received user query input or the natural language descriptors of the capabilities for the AI productivity tool enableable software applications.

A hardware processor in an embodiment at block 712 may execute machine readable code instructions of a cosine or other semantic similarity search algorithm comparing the vectorized query input intent value against a plurality of capability intent values associated with AI productivity tool enableable software application natural language capability descriptions for a first level of the hierarchical capabilities decision tree, linked together within parent-child relationships of the hierarchical capabilities decision tree. For example, a hardware processor may execute machine readable code instructions for a semantic similarity search machine learning model, via executing machine readable code instructions of a query intent to capability module, that compares the vectorized user query input intent value 481 and the capability intent values 482*a*-482*c* stored within the natural language capability database 456 as shown in FIG. 4. Such a comparison may be performed using a semantic search machine learning model, such as a cosine similarity search algorithm that compares the distance or vector value differences in a multi-axis vector space between two vectors (e.g., a query vector intent value 481 and each of a plurality of vector capability intent values 482*a*, 482*b*, and 482*c*) to determine the contextual similarity between the natural language description of the capabilities having the capability intent values 482*a* to 482*c* and the natural language user query input having the user query input intent value 481. This may be performed for several of the capability intent values (such as 482*a*, 482*b*, and 482*c*) stored within the natural language capability database 455 to identify a capability intent value (e.g., 482*a*) that most closely matches the user query input value 481.

A hardware processor executing machine readable code instructions for a semantic search machine learning model of the similarity search module (e.g., 280 of FIG. 2) may determine a distance between the query input intent value 481 and each of a plurality of capability intent values 482*a* to 482*c*. Then, for each of those determined distances, the hardware processor executing machine readable code instructions for a semantic search machine learning model of the similarity search module (e.g., 280 of FIG. 2) may determine an angular similarity having a value between zero and one for the query input intent value 481 and each of a plurality of capability intent values 482*a* to 482*c*. This angular similarity value in an embodiment may comprise the cosine similarity search score (e.g., 488*a*, 488*b*, and 488*c*, respectively) for a given capability intent value (e.g., 482*a*, 482*b*, or 482*c*, respectively), where zero is a worst match and one is a best match between the given capability intent value (e.g., 482*a*, 482*b*, or 482*c*) and the query input intent value 481. In such a way, a hardware processor executing code instructions for the query intent to capability module for the OTB AI productivity tool may take relevance and context of natural language within a user query input into account when determining a matching capability of an AI productivity tool enableable software application that is most likely to address the user's intent within the user query input.

In an embodiment at block 714, machine readable code instructions of an OTB AI productivity tool similarity search module may be executed to perform a text frequency-inverse document frequency (TF-IDF) similarity search algorithm comparing the natural language text of the query input against each of the plurality of AI productivity tool enableable software application natural language capability descriptions for the capability nodes for the first level of the hierarchical capabilities decision tree. For example, in an embodiment described with reference to FIG. 5, the hardware processor executing code instructions for the similarity search module 280 may perform a TF-IDF algorithm to measure the frequency with which each of a plurality of natural language terms appear within the user query input 591, as weighted by the frequency with which that term occurs in one of each of the natural language descriptions of capabilities 592*a*, 592*b*, and 592*c* for capability nodes stored within the natural language capabilities database 555 being compared to the user query input 591. More specifically with respect to the example of FIG. 5, the hardware processor executing machine readable code instructions for the similarity search module may determine a TF-IDF similarity score 593*a* of 0.1 measuring the frequency with which each of a plurality of natural language terms, including "password," and "locked" from the first example above, appear in the user query input 591, as weighted by the frequency with which each of those terms also occur within the natural language description for capability 592*a*. As another example, the hardware processor executing code instructions for a TF-IDF algorithm may determine a TF-IDF similarity score 593*b* of 0.98 measuring the frequency with which each of a plurality of natural language terms, including "account," "password," and "locked" appear in the user query input 591, as weighted by the frequency with which each of those terms occur within the natural language capability 592*b*. In yet another example, the hardware processor executing code instructions for a TF-IDF algorithm may determine a TF-IDF similarity score 593*c* of 0.001 measuring the frequency with which each of a plurality of natural language terms, including "account," "password," and "locked" appear in the user query input 591, as weighted by the frequency with which each of those terms occur within the natural language capability 592*c*. Each TF-IDF similarity score determined in such a way may have a value between zero and one. Thus, if there is a TF-IDF match of terms such as "account," "password," and "locked" with those terms in a capability natural language description, the capability will have an increased weighting for a match over other capabilities that do not contain this term in embodiments herein. This may then avoid selection of a capability node such as "Outlook password" of 397*b* in FIG. 3 and focus instead toward "account password issues" of 395*d* and "Reset password for locked account" at 397*c* for the initial query as "reset password for locked account" at 591 in one example embodiment. It is contemplated that any number of known or later-developed TF-IDF comparison algorithms may be used, including the best-match 25 (BM25) algorithm, the Okapi BM25 algorithm, and the BM-25 with fields (BM-25F).

The hardware processor in an embodiment at block 716 may execute machine readable code instructions of an OTB AI productivity tool query intent to capability determination module to weigh the determined cosine or other semantic similarity search scores for each of the plurality of AI productivity tool enableable software application natural language capability descriptions by the TF-IDF similarity score for that AI productivity tool enableable software application natural language capability description at an assessed capability node. This may provide a TF-IDF weighted cosine or other semantic similarity search score for each of the AI productivity tool enableable software application natural language capability descriptions in capability nodes at the first level of the hierarchical capabilities decision tree in embodiments of the present disclosure. For example, the cosine or other semantic similarity search scores 583*a* to 583*c* may be multiplied by the TF-IDF similarity search scores 593*a* to 593*c*, respectively in an embodiment. More specifically, the cosine or other semantic similarity search score 0.5 of 583*a* may be multiplied by the TF-IDF similarity search score 593*a* of 0.1 in an embodiment to yield a TF-IDF weighted cosine semantic similarity search score 594*a* of 0.05. In another example, the cosine or other semantic similarity search score 0.745 of 583*b* may be multiplied by the TF-IDF similarity search score 593*b* of 0.98 in an embodiment to yield a TF-IDF weighted cosine semantic similarity search score 594*b* of 0.74. In yet another example, the cosine or other semantic similarity search score 0.1 of 583*c* may be multiplied by the TF-IDF similarity search score 593*c* of 0.001 in an embodiment to yield a TF-IDF weighted cosine semantic similarity search score 594*c* of 0.0001.

Each of the cosine or other semantic similarity search scores 583*a*, 583*b*, and 583*c* output of the semantic search comparison is weighted by one of the TF-IDF similarity search scores 593*a*, 593*b*, and 593*c*, respectively, for each natural language capability 592*a*, 592*b*, and 592*c* of capability nodes in the hierarchical decision tree that is compared to the user query input 591, via the hardware processor executing machine readable code instructions of the query intent to capability determination module. This may yield the TF-IDF weighted semantic similarity score 594*a*, 594*b*, and 594*c* for each natural language capability 592*a*, 592*b*, and 592*c* of a capability nodes being compared. For example, the cosine or other semantic similarity search scores 583*a* to 583*c* may be multiplied by the TF-IDF similarity search scores 593*a* to 593*c*, respectively in an embodiment. In such a way, the hardware processor executing code instructions for the query intent to capability module for the OTB AI productivity tool may enhance semantic search performance by also considering critical keywords when determining a matching capability of an AI productivity tool enableable software application that is most likely to address the user's intent within the user query input.

At block 718, for each remaining level of the hierarchical capabilities decision tree, the hardware processor executing machine readable code instructions for the query intent to capability determination module may determine a TF-IDF weighted cosine semantic similarity search score only for the children of the capability natural language description identified as the parent best match previous level parent capability node for the previous level of the hierarchical capabilities decision tree. For example, in an embodiment described with respect to FIG. 6, the hardware processor executing machine readable code instructions for the query intent to capability determination module may determine a TF-IDF weighted cosine semantic similarity search score only for the children of the capability natural language description identified as the parent best match first level parent capability node 683*b* for the previous level of the hierarchical capabilities decision tree. Comparison of TF-IDF weighted cosine semantic similarity search scores, as performed via execution of machine readable code instructions of the query intent to capability determination module by the hardware processor in embodiments herein, may be limited at each level of the hierarchical capabilities decision tree to children of the natural language description of the capability at the previous level having a capability intent value generating a highest parent TF-IDF weighted cosine semantic similarity search score in embodiments herein. This may save processing resources and time from executing TF-IDF weighted cosine semantic similarity search score determination for all capability nodes in the hierarchical capabilities decision tree.

For example, in an embodiment, the parent best match first level parent capability node 683*b* for the natural language description "accounts" has a highest TF-IDF weighted cosine semantic similarity search score of 0.73 at the first level of the hierarchical capabilities decision tree of FIG. 6 to the query input and query input intent value 681 for "reset password for locked account." In such an embodiment, the hardware processor executing machine readable code instructions for the query intent to capability determination module may determine, for each second level child node 685*c* and 685*d* for the first level parent node 683*b*, TF-IDF weighted cosine semantic similarity search scores of 0.271 and 0.81 at 585*c* and 685*d*, respectively, that compare the vectorized user query input intent value 681 and the capability intent values for the natural language descriptions "add an account," and "account password issues" of the nodes 685*c* and 685*d* at the second level of the hierarchical capabilities decision tree. Other second level child capability nodes (not shown in FIG. 6) that are children of first level parent capability nodes 683*a* and 683*c* are not assessed for TF-IDF weighted cosine semantic similarity search scores in embodiments herein.

Thus, the TF-IDF weighted cosine semantic similarity search score of 0.81 for the natural language description of "account password issues" of the capability node 685*d* is the highest TF-IDF weighted cosine semantic similarity search score considered at the first level of the hierarchical capabilities decision tree and is higher than the TF-IDF weighted cosine semantic similarity search score for the first level parent capability node 683*b*. In such a scenario, the hardware processor executing machine readable code instructions for the query intent to capability determination module may focus determination of TF-IDF weighted cosine semantic similarity search scores for the next, second level (e.g., 396 of FIG. 3) of nodes 685*c* and 685*d* within the hierarchical capabilities decision tree. Similarly, at this next second level of the hierarchical decision tree, the similarity search may proceed to the third level to include only third level child capability nodes 687*c* and 687*d* of the second level (now parent) capability node 685*d* that may be determined in turn to have the highest TF-IDF weighted cosine semantic similarity search score of 0.81 for the second level capability nodes of the hierarchical capabilities decision tree in embodiments herein.

For example, the hardware processor executing machine readable code instructions for the query intent to capability determination module may determine, for each third level child capability node 687*c* and 687*d* branched from the second level parent best match capability 685*d* at the second level of the hierarchical capabilities decision tree, TF-IDF weighted cosine semantic similarity search scores of 1.05 and 0.32 at 687*c* and 687*d*, respectively. These cosine semantic similarity search scores of 1.05 and 0.32 at 687*c* and 687*d*, respectively compare the vectorized user query input intent value 681 and the capability intent values for the natural language descriptions "reset password for locked account," and "account recovery" of the third level child capability nodes 687*c* and 687*d*. As there are no further children capability nodes in the hierarchical decision tree, the similarity search may stop at this third level in some embodiments.

This process of determining the highest TF-IDF weighted cosine semantic similarity search score among natural language descriptions of capabilities for child nodes of a parent node having a highest TF-IDF weighted cosine semantic similarity search score at a previous level of the hierarchical capabilities decision tree may be repeated for each level (e.g., 392, 394, and 396 of FIG. 3) of the hierarchical capabilities decision tree, until it is determined that the next level node of a branch having most recently identified highest TF-IDF weighted cosine semantic similarity search score for its level within the hierarchical capabilities decision tree does not have a child capability node in some embodiments. In other embodiments, the above process may proceed until it is determined that the next level node of a branch having most recently identified highest TF-IDF weighted cosine semantic similarity search score for its level within the hierarchical capabilities decision tree has only child capability nodes at the next lower level of the hierarchical capabilities decision tree with lower TF-IDF weighted cosine semantic similarity search scores in other embodiments.

At that point, the hardware processor executing code instructions for the query intent to capability determination module may identify the capability identified for the capability intent node among the levels along the selected branch of the hierarchical capabilities decision tree having the most recently identified highest TF-IDF weighted cosine semantic similarity search score as the best match capability responsive to the user query input and query input intent 681. In such a way, the hardware processor executing machine readable code instructions of the query intent to capability determination module may consistently narrow focus of comparisons between the query input intent value and the plurality of capability intent values to natural language descriptions of increasing specificity, while still taking into account the importance of various keywords within the user query input natural language.

At block 720, a hardware processor may execute machine readable code instructions of an OTB AI productivity tool query intent to capability determination module to identify the AI productivity tool enableable software application natural language capability having a highest TF-IDF weighted cosine or other semantic similarity search score as the best match capability for the received user query input in a first embodiment. For example, the natural language capability for an AI productivity tool enableable software application having the highest TF-IDF weighted cosine semantic similarity search score may then be identified, via execution of machine readable code instructions of the query intent to capability determination module by the hardware processor, as the capability node in the hierarchical capabilities decision tree for a capability most likely to address the user's intended request within the natural language user query input. In a specific example embodiment, the natural language capability description of third level capability node 687*d* for "reset password for locked account" for an AI productivity tool enableable software application having the highest TF-IDF weighted cosine semantic similarity search score of 1.05 may then be identified, via execution of machine readable code instructions of the query intent to capability determination module by the hardware processor, as the capability most likely to address the user's intended request within the natural language user query input. Use of the highest TF-IDF weighted cosine semantic similarity search score in the assessed branch of the hierarchical capabilities decision tree may be useful in comparison amongst TF-IDF weighted cosine semantic similarity scores between capability nodes at different levels of the hierarchical capabilities decision tree in embodiments herein.

The hardware processor in an embodiment at block 722 may execute machine readable code instructions of an OTB AI productivity tool to instruct the AI productivity tool enableable software application associated with the best match capability for the received user query input to execute the best match capability. In an example embodiment, the hardware processor executing machine readable code instructions of the OTB AI productivity tool determines that the best match capability has the natural language capability description of "reset password for locked account" and either the highest TF-IDF weighted cosine semantic similarity search score of 1.05 or the highest parent and TF-IDF weighted cosine semantic similarity search score of 0.8505. In such an example embodiment, the hardware processor may execute machine readable code instructions of the OTB AI productivity tool to instruct the AI productivity tool enableable software application 211 to execute the capability identified within the node 685*c* of FIG. 6 for the phrase "reset password for locked account" in response to the query "reset my password for a locked account."

Thus, the hardware processor of the information handling system may respond to a user input query with an artificial intelligence responsive action to execute machine readable code instructions the AI productivity tool enableable software application associated with the best match capability for the received user query input to execute the best match capability. For example, the hardware processor may execute machine readable code instructions the AI productivity tool enableable software application associated with the best match capability node in response to the received user query input and determined from a hierarchical capabilities decision tree storing gathered capabilities. The method for identifying a capability of an AI productivity tool enableable software application that best matches a received user query input through a TF-IDF weighted semantic search that considers a cosine semantic similarity search score and a TF-IDF score for a subset of capabilities within a hierarchical capabilities decision tree may then end.

The blocks of the flow diagram of FIG. 7 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system executing computer readable code instructions for an on the box (OTB) artificial intelligence (AI) productivity tool comprising:

a natural language capabilities database memory to store natural language descriptions of capabilities associated with each of a plurality of AI productivity tool-enablable software applications executing on the information handling system in a capabilities decision tree with each capability stored under a plurality of branches as a capability node grouped under a selected branch of the capabilities decision tree according to logical topics in hierarchical parent-child relationships, wherein metadata for each capability node identifies a child capability node or parent capability node of the capability node;

a hardware processor executing computer-readable program code instructions of the OTB AI productivity tool to generate capability intent values from the natural language descriptions of the capabilities and storing the capability intent values with the capability nodes;

the hardware processor executing computer-readable program code instructions to generate a query input intent value from a user query input received via text or audio requesting an action by one of the plurality of AI productivity tool-enablable software applications;

the hardware processor executing computer-readable program code instructions to perform a text frequency-inverted document frequency (TF-IDF) weighted cosine semantic similarity search semantically comparing the capability intent values of the capability nodes along the selected branch from the plurality of branches in the capabilities decision tree with the query input intent value, as weighted by a TF-IDF comparison between natural language of the user query input and each of the natural language descriptions of capabilities of the capability nodes to identify a best match capability node having a highest TF-IDF weighted cosine semantic similarity search score with the query input intent value; and the hardware processor executing computer-readable program code instructions for a first AI productivity tool-enablable software application having the best match capability node to execute an associated best match capability in response to the user query input.

2. The information handling system of claim 1, wherein the TF-IDF comparison is conducted with computer readable code instructions for a best match 25 (BM25) algorithm.

3. The information handling system of claim 1, wherein the TF-IDF weighted cosine semantic similarity search includes a parent score and TF-IDF weighted cosine semantic similarity search that generates, for each child capability node in the branch, a parent and TF-IDF weighted cosine similarity search score that is weighted by the TF-IDF weighted cosine similarity search score determined for the parent capability node.

4. The information handling system of claim 1, wherein the hardware processor executing computer-readable program code instructions to perform the TF-IDF weighted cosine semantic similarity search compares the capability intent values of plural capability nodes along a first level of the capabilities decision tree to determine a parent capability node having a highest TF-IDF weighted cosine semantic similarity search score on the first level of the capabilities tree for selecting the selected branch from the plurality of branches in the capabilities decision tree having child capability nodes to be further analyzed by the TF-IDF weighted cosine semantic similarity search to identify the best match capability node among the capability nodes along the selected branch.

5. The information handling system of claim 1 further comprising:

the hardware processor executing computer-readable program code instructions of the first AI productivity tool-enablable software application to perform the best match capability to automatically execute changes to or update one or more local software applications in response to the user query input.

6. The information handling system of claim 1, wherein the capability intent values are generated by execution of code instructions for a text embedding algorithm and mathematically represent semantic meaning for words or phrases within the natural language descriptions for the capabilities for correlation with the query intent input value generated from the user query input.

7. The information handling system of claim 1, wherein the TF-IDF weighted cosine semantic similarity search determines a degree of angular similarity between vector values for the capability intent values and the query input intent value that mathematically represent one or more phrases within the natural language descriptions for the capabilities and natural language of the user query input as weighted by the TF-IDF comparison.

8. The information handling system of claim 1, wherein the TF-IDF comparison is conducted with computer readable code instructions for a best match 25 (BM25) algorithm.

9. A method for executing computer readable code instructions of an on the box (OTB) artificial intelligence (AI) productivity tool at an information handling system to respond to a user query input comprising:

storing, in a natural language capabilities database memory, the natural language descriptions of capabilities for a plurality of AI productivity tool-enablable software applications executing on the information handling system, and capability intent values generated from the natural language descriptions in capability nodes in a capabilities decision tree, where each capability node is grouped under a branch of a plurality of branches in the capabilities decision tree according to logical topics in hierarchical parent-child relationships and where metadata for each of those capability nodes identifies a child capability node or parent capability node of each of those capability nodes;

generating, via a hardware processor executing machine readable code instructions of the OTB AI productivity tool, a query input intent value from the user query input received via text or audio requesting an action by one of the plurality of AI productivity tool-enablable software applications;

performing, via a hardware processor, a text frequency-inverted document frequency (TF-IDF) weighted semantic similarity search comparing the capability intent values of the each of the capability nodes along the branch of the plurality of branches in the capabilities decision tree with the query input intent value and weighted by a TF-IDF comparison between the user query input and the natural language descriptions of the capability nodes along the branch of the plurality of branches in the capabilities decision tree to identify a best match capability node among the capability nodes along the branch having a highest TF-IDF weighted semantic similarity search score with the user query input; and executing computer-readable program code instructions for a first AI productivity tool-enablable software application having the best match capability node to execute an associated best match capability in response to the user query input.

10. The method of claim 9 wherein the TF-IDF weighted semantic similarity search includes a parent score and TF-IDF weighted semantic similarity search that generates, for each child capability node in the branch, a parent and TF-IDF weighted similarity search score that is weighted by the TF-IDF weighted similarity search score determined for the parent capability node.

11. The method of claim 9, wherein the capability intent values are generated by execution of code instructions for a text embedding algorithm and mathematically represent semantic meaning for words or phrases within the natural language descriptions for the capabilities for correlation with the query input intent value generated from natural language of the user query input.

12. The method of claim 9, wherein computer-readable program code instructions of a latent semantic analysis text embedding algorithm are executed via the hardware processor for generating the capability intent values and the query input intent value.

13. The method of claim 9, wherein the hardware processor executing computer-readable program code instructions to perform the TF-IDF weighted semantic similarity search compares the capability intent values of plural capability nodes along a first level of the capabilities decision tree to determine a parent capability node having a highest TF-IDF weighted semantic similarity search score on the first level of the capabilities tree for selecting the branch of the plurality of branches in the capabilities decision tree having child capability nodes to be further analyzed by the TF-IDF weighted semantic similarity search to identify the best match capability node among the capability nodes along the branch.

14. The method of claim 9, wherein a cosine semantic search machine learning algorithm generates the TF-IDF weighted semantic similarity search score for each of the capabilities by performing a cosine semantic similarity search comparing a degree of angular similarity between vector values for the capability intent values in the capability nodes of the branch of the plurality of branches in the capabilities decision tree with the query input intent value and weighting the cosine semantic similarity search with the TF-IDF comparison of terms in the user query input with the natural language descriptions of each of the capability nodes.

15. The method of claim 9 further comprising:

executing computer-readable program code instructions of the first AI productivity tool-enablable software application, via the hardware processor, to perform the best match capability to optimize settings for a hardware component of the information handling system in response to the user query input.

16. An information handling system executing computer readable code instructions for an on the box (OTB) artificial intelligence (AI) productivity tool comprising:

a natural language capabilities database memory to store natural language descriptions of capabilities associated with each of a plurality of AI productivity tool-enablable software applications executing on the information handling system, capability intent values generated from the natural language descriptions for each capability, and a capability identification in capability nodes in a capabilities decision tree with each of the capability nodes grouped under a branch of a plurality of branches in the capabilities decision tree according to logical topics in hierarchical parent-child relationships, wherein metadata for each of the capability nodes identifies a child capability node or parent capability node of each of those capability nodes;

the hardware processor executing computer-readable program code instructions to generate a query input intent value from a user query input received via text or audio requesting an action by one of the plurality of AI productivity tool-enablable software applications;

the hardware processor executing computer-readable code instructions for performing a text frequency-inverted document frequency (TF-IDF) comparison between natural language of the user query input and each of the natural language descriptions of the capabilities along the branch of the capabilities decision tree for TF-IDF similarity values; and the hardware processor executing computer-readable program code instructions to perform a TF-IDF weighted cosine semantic similarity search comparing the capability intent values of the capability nodes along the branch of the plurality of branches in the capabilities decision tree and weighted by the TF-IDF similarity values to identify a best match capability node having a highest TF-IDF weighted cosine semantic similarity search score with the query input intent value; and the hardware processor executing computer-readable program code instructions for a first AI productivity tool-enablable software application having the best match capability node to execute an associated best match capability in response to the user query input.

17. The information handling system of claim 16, wherein the capability intent values are generated by execution of code instructions for a text embedding algorithm and mathematically represent semantic meaning for words or phrases within the natural language descriptions for the gathered capabilities for correlation with the natural language of the query input intent value generated from the natural language of the user query input.

18. The information handling system of claim 16, wherein the hardware processor executes computer-readable program code instructions of a cosine semantic search machine learning algorithm for generating the TF-IDF weighted semantic similarity search score for each of the capabilities by comparing the capability intent values in the branch of the plurality of branches in the capabilities decision tree to the query input intent value.

19. The information handling system of claim 16, wherein the hardware processor executing computer-readable program code instructions to perform the TF-IDF weighted semantic similarity search compares the capability intent values of plural capability nodes along a first level of the capabilities decision tree to determine a parent capability node having a highest TF-IDF weighted semantic similarity search score on the first level of the capabilities tree for selecting the branch of the plurality of branches in the capabilities decision tree having child capability nodes to be further analyzed by the TF-IDF weighted semantic similarity search to identify the best match capability node among the capability nodes along the branch.

20. The information handling system of claim 16 further comprising:

the hardware processor executing computer-readable program code instructions of the first AI productivity tool-enablable software application to perform the best match capability to provide hardware component adjustment for a hardware component of the information handling system in response to the user query input.

* * * * *